(12) United States Patent
Bruso et al.

(10) Patent No.: US 7,809,759 B1
(45) Date of Patent: Oct. 5, 2010

(54) DYNAMIC PRECONDITIONING OF A B+TREE

(75) Inventors: Kelsey L. Bruso, Minneapolis, MN (US); James M. Plasek, Shoreview, MN (US)

(73) Assignee: Unisys Corporation, Blue Bell, PA (US)

(*) Notice: Subject to any disclaimer, the term of this patent is extended or adjusted under 35 U.S.C. 154(b) by 522 days.

(21) Appl. No.: 11/901,354

(22) Filed: Sep. 17, 2007

Related U.S. Application Data

(63) Continuation-in-part of application No. 11/506,224, filed on Aug. 18, 2006.

(51) Int. Cl.
*G06F 7/00* (2006.01)
*G06F 17/30* (2006.01)

(52) U.S. Cl. .................................. 707/797; 707/803
(58) Field of Classification Search ................ 707/100, 707/101, 103 R, 103 Y, 797, 803
See application file for complete search history.

(56) References Cited

U.S. PATENT DOCUMENTS 5,644,763 A * 7/1997 Roy .......................... 707/101
5,717,919 A * 2/1998 Kodavalla et al. .............. 707/8

\* cited by examiner

*Primary Examiner*—James Trujillo
*Assistant Examiner*—Marc Somers
(74) *Attorney, Agent, or Firm*—Robert P. Marley

(57) ABSTRACT

Various approaches for processing a B+tree data structure of a database are disclosed. In one approach a method determines a pattern of multi-column key values. In response to an insert transaction into the database that requires a new index page and before performing the insert transaction, the method generates a plurality of new multi-column key values based on the pattern and stores one or more of the plurality of multi-column key values in one or more new index pages. Before performing the insert, the method further commits to retentive storage of the one or more new index pages and new data pages as linked to the B+tree. After committing the one or more new index pages and new data pages, the method then proceeds to processes and commits the insert transaction.

12 Claims, 16 Drawing Sheets

DYNAMIC PRECONDITIONING OF A B+TREE

RELATED APPLICATIONS

This application is a continuation-in-part of, and Claims priority to, U.S. patent application Ser. No. 11/506,224 filed Aug. 18, 2006.

FIELD OF THE INVENTION

The present invention generally relates to processing of data structures for a database management system.

BACKGROUND

Relational databases generally require that every record be uniquely identified by one or a combination of columns. The one or more columns that uniquely identify records is declared to be the primary key (PK) of the table.

A B+tree data structure is often used to manage database records. In an example implementation, nodes that are leaves of the B+tree are data pages of database records, and nodes that are parents of the leaves are index pages. The index pages contain primary key values for referencing records in the data pages. The leaves are sequentially linked to provide sequential access to database records.

In some applications a database management system (DBMS) can generally insert records into the database tables with no concurrency problems. For example, for a pre-assigned key such as a social security number (SSN), the order in which records keyed on the SSNs are presented for insertion into the database may be random. Thus, the random order in which pages are inserted into the B+tree minimizes concurrency issues.

In other applications, the primary key may be generated as a monotonically increasing value (e.g., 1, 2, 3) and data records inserted sequentially, which may restrict concurrency in some DBMSs.

Some DMBSs cannot handle concurrent inserts of sequential records because the records are logically inserted on the right-most page of the B+tree, and the selected database recovery approach uses page level recovery rather than record level recovery. Thus, no more than one transaction at a time can insert a value to a given page.

Where restrictions on concurrency may pose a problem, a user may insert dummy records and then delete the records to create the index and data pages for later use in sequentially inserting legitimate records. The insertion and deletion of dummy records permits subsequent concurrent inserts because each subsequent insert will be directed to be stored on a different empty data page. However, inserting and deleting the required dummy records may be time consuming, error prone, and cause different performance and scaling problems.

A method and system that address these and other related issues are therefore desirable.

SUMMARY

The various embodiments of the invention provide methods and systems for processing a B+tree data structure of a database. In one embodiment a method determines a pattern of multi-column key values. In response to an insert transaction into the database that requires a new index page, the method, before performing the insert transaction, generates a plurality of new multi-column key values based on the pattern and stores one or more of the plurality of multi-column key values in one or more new index pages and links each of the plurality of multi-column key values to a respective one of a plurality of new data pages. The method also links the one or more new index pages and new data pages to the B+tree data structure and then commits to retentive storage the one or more new index pages and new data pages. After committing the one or more new index pages and new data pages, the method proceeds to process the insert transaction by storing data specified in the insert transaction to one of the new data pages. The method then commits the one of the new data pages to retentive storage after storing the data in the one of the new data pages.

In another embodiment, an apparatus is provided for processing a B+tree data structure of a database. The apparatus comprises means for detecting in a transaction an insert operation to the B+tree data structure that includes one or more index pages and one or more data pages. A means for determining whether a first index page of the one or more index pages is to be split in performing the insert operation is also included. The apparatus has a means, responsive to determining that the first index page is to be split, for reading sets of column values from the data pages, each set corresponding to a multi-column key. A means determines one or more new sets of index values based on the sets of column values, and another means stores each of the one or more new sets of index values in one or more new index pages, and links the one or more new index pages and one or more new data pages to the B+tree data structure. The apparatus has means for committing to retentive storage, the one or more new index pages and one or more new data pages and means for writing data specified in the insert transaction to a first data page of the one or more new data pages after committing the one or more new index pages and one or more new data pages. Another means commits the first data page to retentive storage after writing the data to the first data page.

Yet another embodiment provides a database management system. The database management system includes a processor arrangement, a memory coupled to the processor arrangement, and a mass storage arrangement coupled to the memory. The memory is configured with instructions executable by the processor arrangement for processing a B+tree data structure for data records of a database. The mass storage arrangement is coupled to the memory for retentive storage of the B+tree data structure. In executing the instructions, the processor determines a pattern of multi-column key values from column data types and multi-column key values in the database. In response to an insert transaction into the database that requires a new index page and before performing the insert transaction, the processor obtains one or more new index pages and generates a plurality of new multi-column key values based on the pattern. The processor further stores the new multi-column key values in the new index pages and obtains one or more new data pages before processing the insert transaction. Before processing the insert transaction, the processor also stores in the one or more new index pages in association with each of the plurality of multi-column key values, references to respective ones of the one or more new data pages. The processor then links the one or more new index pages in the B+tree data structure. The one or more new index pages and new data pages are committed to retentive storage, and after committing the one or more new index pages and new data pages, the processor stores data specified in the insert transaction to one of the new data pages. The one of the new data pages is then committed to retentive storage.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
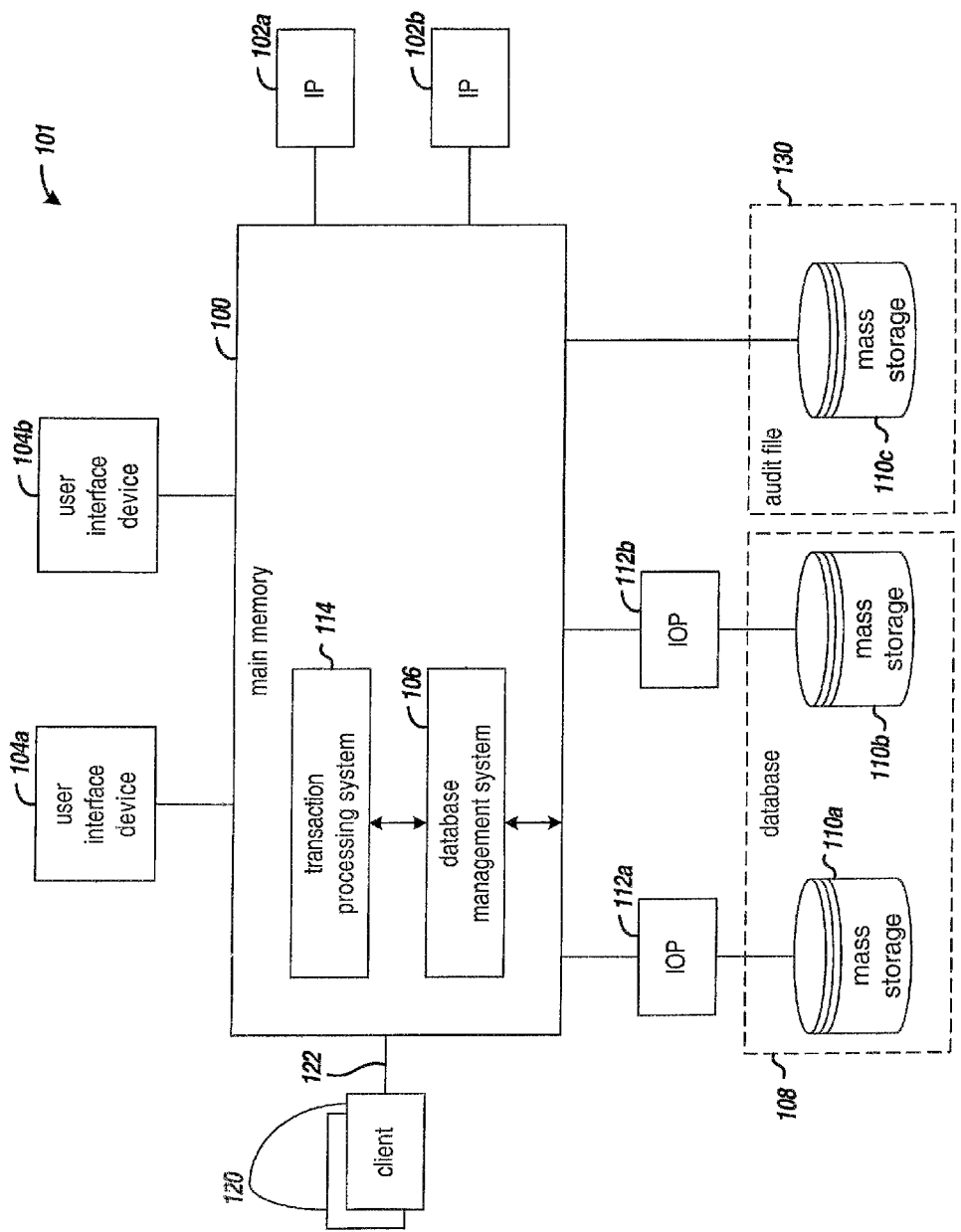
FIG. 1 is a block diagram of an example data processing system in which various embodiments of the invention may be implemented.

FIG. 1 is a block diagram of an example data processing system 101 in which various embodiments of the invention may be implemented. The example system illustrates a large-scale data processing system with multiple instruction processors (IPs) 102a and 102b. However, those skilled in the art will recognize that other types of data processing systems, such as a personal computer or a workstation may be used. The system includes a main memory 100 that is coupled to one or more IPs 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A DBMS 106 is resident in main memory 100 and executes on IPs 102a and 102b to manage and provide access to a database 108 (shown dashed). The database may be stored on an arrangement of one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for redundantly storing multiple copies of the same data on multiple hard disks to improve efficient retrieval of the data, and to increase fault tolerance. Battery back up may be provided, if desired. The transfer of data between mass storage devices and DBMS is performed by Input/Output Processors (IOPs) 112a and 112b.

A transaction processing system 114 may be coupled to DBMS 106. The transaction processing system receives queries for data stored within database 108 from one or more users. Transaction processing system 114 formats the queries and then passes them to DBMS 106 for processing. DBMS 106 processes the queries by retrieving data records from, and storing data records to, the database 108.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from data processing system.

For purposes of database recovery, the DBMS may log data to the audit file 130 (or "audit trail"). With each processed transaction, the DBMS may write to mass storage 110c data that describes updates to one or more pages of data of the database. If recovery of the database is required, the records in the audit file may be used to reconstruct the database.

Figure 2:
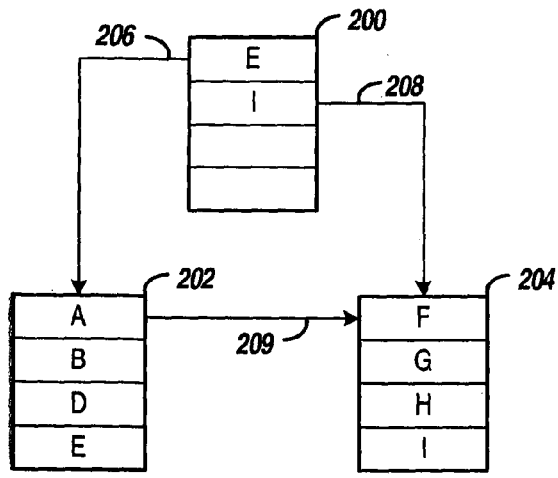
FIG. 2 is an example of a B+tree structure that may be used to represent a database table.

FIG. 2 is an example of a B+tree structure that may be used to represent a database table. In the illustrated B+tree structure only the leaf nodes contain data records and the leaf nodes are sequentially linked. In another embodiment, a B−tree may be employed wherein data records are stored in both the non-leaf and the leaf nodes. The following discussion regarding the B+tree of FIG. 2 illustrates the manner in which a sequence of records is appended to a tree according to prior art practices.

The tree of FIG. 2 includes a non-leaf node 200 and two leaf nodes 202 and 204, which are children of non-leaf node 200. Generally, non-leaf nodes store index values and pointers identifying the child nodes. For example, non-leaf node 200 stores a pointer 206 and an index value "E" that identifies leaf node 202. Similarly, the non-leaf node stores a pointer 208 and an index value "I" identifying leaf node 204. Pointers 206 and 208 may each be an address, an offset, or any other type of indicia that uniquely identifies, and allows for efficient traversal to, a selected one of the leaf nodes. The index values specify the key of the last record stored in the referenced leaf nodes. For example, index "E" indicates that any records having index values between the first index value, "A", and "E" will be located on leaf node 202, and any records having an index value after "E" but before, and including, "I" will be stored on leaf node 204. In another embodiment, non-leaf node 200 could store the index value for the first, rather than the last, record within the respective leaf node.

As discussed above, because the illustrated tree is a B+tree, the non-leaf nodes do not store the actual data records. Those records are only stored on the leaf nodes. For example, leaf node 202 stores records A-E. Similarly, leaf node 204 stores records F-I. These records are stored within the leaf in a sort order dictated by the index values "A", "B", "C", and etc. These index values provide searchable data that are used to access a desired record. One or more index values may be used to arrange the records within a sort order. A primary and/or secondary key value may be used as an index value. As is known in the art, primary and secondary keys are searchable values identifying a record. In some embodiments, the primary key is used to uniquely identify a record. In other embodiments wherein each primary key value is not unique, some other mechanism such as a row identifier is used to uniquely identify each record.

In the tree of FIG. 2, leaf node 202 may store a pointer 209 to leaf node 204. This pointer may be an address or some other indicia that allows a sequential traversal of database records without traversing the index nodes of the tree. If desired, reverse pointers may be provided. For example, a pointer may be stored in leaf node 204 pointing to leaf node 202.

When non-leaf and leaf nodes are created, each of these nodes is allocated a predetermined amount of storage space by DBMS 106. The predetermined amount of storage space allocated to a node corresponds to a page of a file. The page size is usually based on the architectural characteristics of the underlying file system. For example, if the file system manages pages of 1792 bytes, the selected page size may be some multiple of 1792. A database administrator may select the size of the page, for instance. In one embodiment, the leaf nodes are the same size as the non-leaf nodes. In an alternative embodiment, the leaf nodes may be larger than the non-leaf nodes, or vice versa. In any event, DBMS 106 and any database application accessing the database are aware of the size of the leaf and non-leaf nodes.

The following scenario describes the sequential insertion of records in a database and the concurrency limitations that may arise. In sequentially adding records to the database, records having key values A, B, D, E, F, G, H, and I are inserted in order. Note that the tree illustrates the state of the database after all the records have been added. Backing up to the time when record I is inserted, when the record having an index value of I is to be inserted in tree, root node 200 is searched to determine that the last record on node 204 has the index value I. Therefore, pointer 208 will be used to locate node 204, to store the new record. After searching the records of node 204, the insertion point for the new record is located after the record having an index value of H. Since node 204 has adequate space to accommodate this new record, the store operation is performed. During these update procedures, the pages corresponding to nodes 200 and 204 are locked to prevent two software transactions from attempting to update the same records at once. According to prior art methods of adding the sequence of records to the B+tree, the locking of the pages corresponding to nodes 200 and 204 is accomplished by activating an exclusive lock operation on those pages. This type of operation prohibits any other transaction from reading from, or writing to, these nodes until the insert transaction is committed, for example, by creating an audit trail of the transaction in the mass storage arrangement 130.

It may be noted that in some cases, the located leaf node will not have enough space to store a new record. For example, once record I is inserted, node 204 will not have enough storage space available for a record J. In this situation, another leaf node must be created. This node is added to the tree by updating parent node 200 to include a pointer to the new leaf node. Additionally, pointers are updated and/or created at the leaf-node level to link the new node to one or more adjacent leaf nodes. For example, if a new leaf node is inserted between nodes 202 and 204, pointer 209 is updated to point to this new node. A pointer is also created within the new leaf node to point to leaf node 204. In this type of situation, all nodes associated with these operations must be locked during the update operation. For example, if node 202 is being updated to include a pointer to a newly created leaf node, the page corresponding to node 202 must be locked during the update and creation of the audit trail entry.

In the scenario described above, appending a sequence of records to a database can be particularly time consuming because concurrency is limited by the sequence of updates to the index page (e.g., 200).

To address the problems associated with storing a sequence of records to a database, some DBMSs utilize record-level locking during audit trail creation. Returning to the foregoing illustration, these systems lock only the records within nodes 200 and 204 that are being updated with the new index value and data, respectively, instead of locking an entire page corresponding to a node. This allows a concurrent request to store a record to the same leaf node that stores the previous record while the audit trail entry for that previous record is still under creation. However, this type of record-level locking substantially affects performance when system recovery must be performed after a failure occurs. This is because operations specified in each of the audit trail entries must be applied to a saved copy of the database in the correct sequence, one at a time. In contrast, when page-level locking is performed, an entire page may be recovered using a single copy operation.

The various embodiments of the invention provide dynamic preconditioning of a B+tree without explicit user intervention, thereby promoting a greater level of concurrency. Generally, while processing an insert to the database, the DBMS determines whether a state of the database would limit concurrency while records are added sequentially. In response to determining the limited concurrency, the DBMS initiates a nested transaction and creates a selected number of empty data pages, and index pages if needed, for use during sequential inserts. The index page(s) and empty data pages are committed to the database prior to continuing with processing of the insert operation that triggered the preconditioning. In the various preconditioning approaches described herein, an "insert to the data base" and an "insert transaction" are intended to encompass inserts to the data base that result from SQL INSERT statements as well as inserts that result from an SQL UPDATE statement which may have been split into a "delete transaction" and an "insert transaction."

This means that a rollback of the transaction that triggered preconditioning would not affect the updates made during preconditioning. Preconditioning can therefore be thought of as a nested transaction. The commit of this nested transaction involves writing the updated pages to the log (also referred to as an audit trail). It may also, depending on implementation objectives, involve writing the updated pages to the database file.

Figure 3:
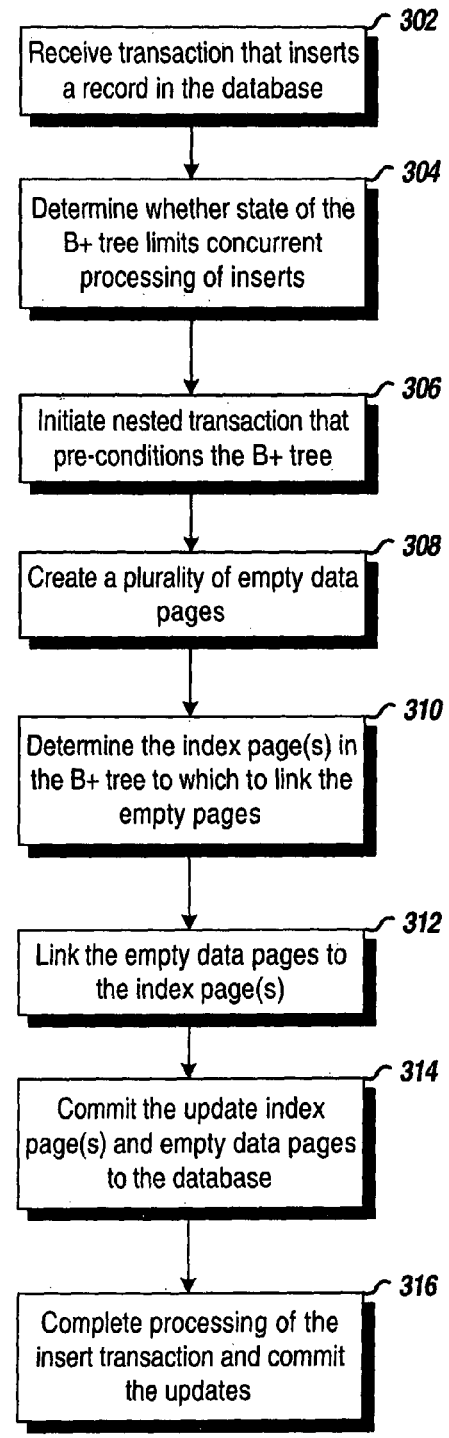
FIG. 3 illustrates a process for dynamically pre-conditioning a B+tree in accordance with various embodiments of the invention.

FIG. 3 illustrates a process for dynamically pre-conditioning a B+tree in accordance with various embodiments of the invention. Without user intervention and in the midst of processing an insert of a record to the database, the various embodiments of the present invention dynamically precondition the B+tree to accommodate concurrency in sequential inserts to the database. The DBMS receives a transaction that inserts a record in the database (step 302), and in response, determines whether the state of the database would limit concurrent inserts (step 304).

In response to finding the database in a state that limits insert concurrency, and knowing the pattern of the primary key sequence, the DBMS initiates a nested transaction to precondition the B+tree before processing the triggering insert operation (step 306). In general, a plurality of empty data pages are created (step 308). The manner in which empty data pages are created or allocated relies on the same facilities that the DBMS uses to allocate a new data page when insertion of a data record requires a new data page. For example, the underlying file management system may be called upon to allocate additional storage to the database table. Instead of writing data to the allocated data pages, the data pages remain empty for use by concurrent insert operations after preconditioning completes.

The index page or pages in the B+tree to which the empty data pages are to be linked are determined based on the state of the database (step 310). The pattern of the primary key sequence (as discussed further in the scenarios below) generally refers to whether records are strictly inserted in key sequential order, whether the database has divisions and the records are inserted in key sequential order within each division, or whether records are inserted in random key order. The DBMS may be told the pattern of the primary key sequence by way of the database definition or it may discover the pattern. For example, the key column may be declared or defined as an IDENTITY column or as a SEQUENCE. IDENTITY and SEQUENCE are example designations used in the standard query language (SQL) to identify key values are to be generated by the DBMS or by the application in sequential order. Another table attribute, such as a partitioned table, or a table defined with a multi-column key (which indicates a division), might indicate that the key values are to be generated by the DBMS or by the application in sequential order within each partition (division). The absence of these table attributes might indicate that the key values are random. Alternatively, by monitoring or sampling the key values in the table, the DBMS may determine the pattern of the primary key sequence. The discussion and the scenarios below illustrate applying various embodiments of the invention to key values that are generated sequentially, generated sequentially within a division, or generated randomly. These scenarios are not intended to limit the applicability of the invention, but to illustrate three embodiments.

The empty data pages are linked to the one or more index page(s) (step 312), and the updated index page(s) and empty data pages are committed to the database (step 314). Committing the pages to the database may be accomplished by writing to an audit file in retentive mass storage log records that specify the page updates. Alternatively, or additionally, the updated pages may be written to the database tables in retentive mass storage. After the empty data pages and updated index page(s) have been committed, the nested transaction is complete and the B+tree has effectively been pre-conditioned to allow concurrent sequential inserts.

Following completion of the nested transaction, the insert that triggered the nested transaction may be processed (step 316).

Various scenarios in which the DBMS dynamically preconditions the B+tree are described in the following figures. Each scenario generally refers to information the database management system determines regarding the primary key values that are generated as records are inserted and the structure of the database table, and the description describes the process steps associated with the nested transaction for performing the dynamic preconditioning based on the particular state.

Figure 4A:
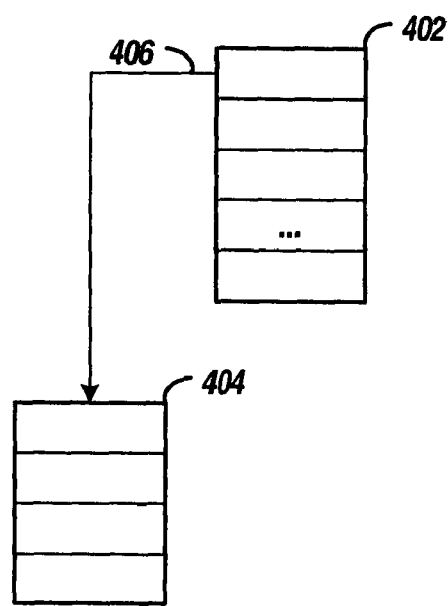
FIG. 4A shows the state of a B+tree before any records have been inserted.
Figure 4B:
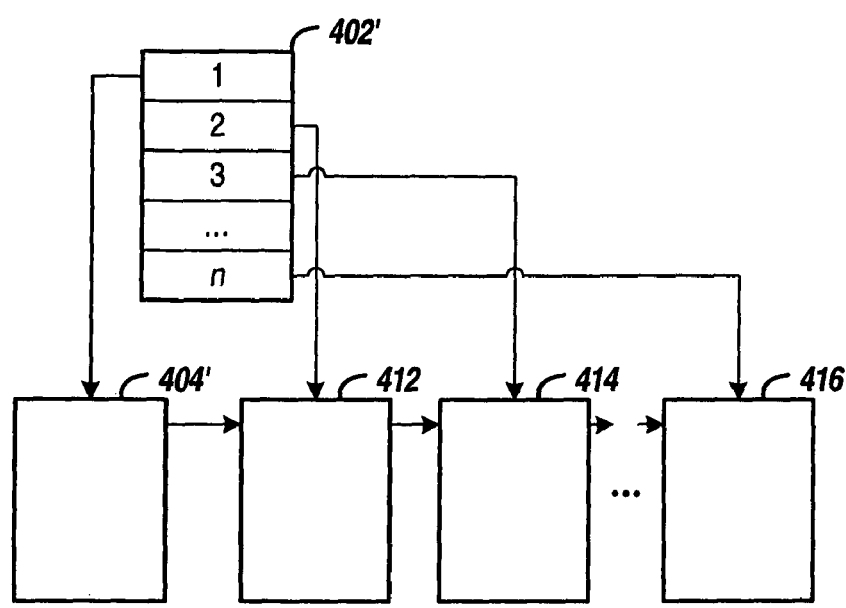
FIG. 4B shows the state of the B+tree after having been dynamically preconditioned in accordance with various embodiments of the invention.

FIGS. 4A and 4B illustrate a scenario in which records are sequentially inserted at the end of a database table. FIG. 4A shows the state of a database B+tree before any records have been inserted in a database (the index page 402 has a single empty data page 404), and FIG. 4B shows the state of the B+tree after having been dynamically preconditioned in accordance with various embodiments of the invention.

The dynamic preconditioning illustrated by FIGS. 4A and 4B is triggered when an insert operation is detected by the DBMS, the inserts are in key-sequential order, and the database is initially empty. An insert operation is identified by the DBMS by way of an operation code specified in a transaction, for example. When the database is empty, as shown in FIG. 4A, the index page 402 does not contain a key and has a pointer 406 to an empty data page 404. Since the database is empty, the lone empty data page 404 is both the leftmost and rightmost page referenced by the index page 402.

With an empty database table and without application of the present invention, creation of an empty B+Tree results in only a single index page and a single data page. Because there is only one empty data page and assuming page-level locking, concurrent inserts would not be allowed because either the data page would be locked for inserts of multiple records to the data page or the index page would be locked for inserts of one record per data page.

To allow multiple transactions to concurrently insert records in accordance with one embodiment, each data page is limited to storing only one record. The first insert into the B+tree triggers preconditioning. Preconditioning, as shown in FIG. 4B, creates as many child data pages as the index page can support (shown as n). The key values of the records on the index page 402' reflect the sequence specified by the database definition, e.g., 1, 2, 3, . . . . The data pages 404', 412, 414, . . . 416 are linked together and contain no records.

Table 1 describes the steps of the nested transaction for performing the dynamic preconditioning for the example illustrated in FIGS. 4A and 4B.

TABLE 1

Begin nested transaction
Calculate the number of key values which can fit onto an index page, i
Get the first number in the sequence, s and the increment value, c
Acquire i − 1 data pages (there is an initial data page in the B+ Tree) and
    link them together
Set the first data page's high value h to the first key value s
Populate the existing empty index page with records:
    FOR rec_count := 1 TO i DO
        insert index record with key value h
        h := h + c
        Link new index record to corresponding data page.
    END FOR
Commit nested transaction.

Figure 5A:
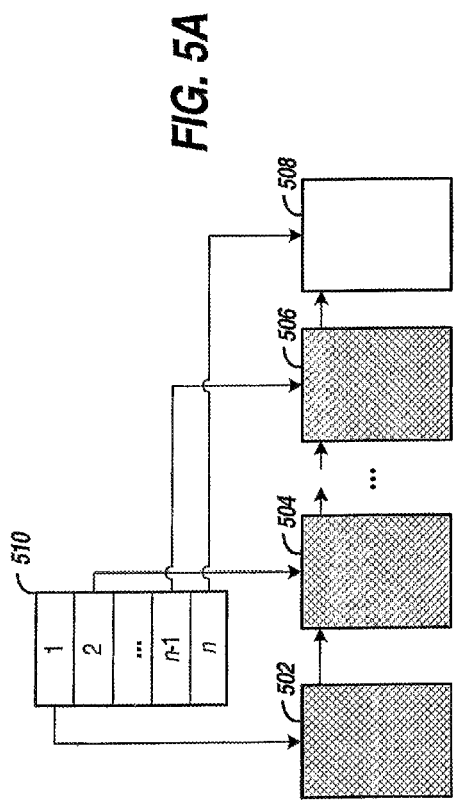
FIG. 5A shows the state of a database B+tree with all the data pages of an index page being full.
Figure 5B:
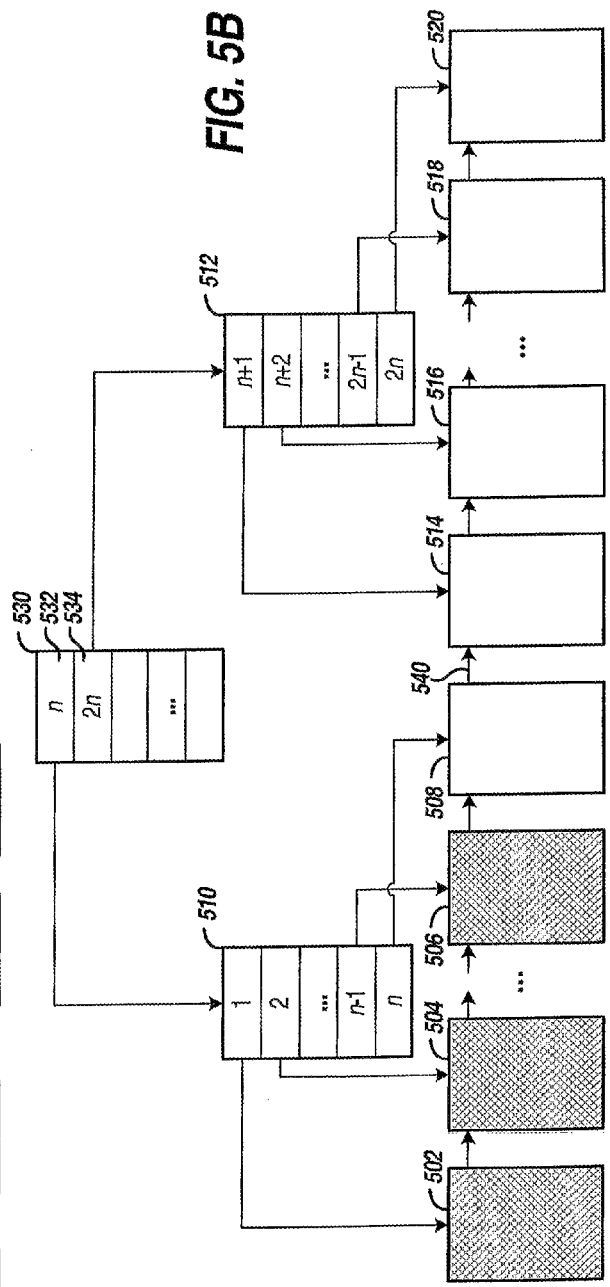
FIG. 5B shows the state of the B+tree after having been dynamically preconditioned in accordance with various embodiments of the invention.

FIGS. 5A and 5B illustrate a scenario that is a variation of the scenario of FIGS. 4A and 4B where some records have already been inserted in the B+tree. FIG. 5A shows the state of a database B+tree with the data pages 502, 504, 506 of index page 510 being full, as designated by the cross-hatching, and an insert to data page 508 triggering pre-conditioning, and FIG. 5B shows the state of the B+tree after having been dynamically preconditioned in accordance with various embodiments of the invention.

The dynamic preconditioning illustrated by FIGS. 5A and 5B is triggered when an insert operation is detected by the DBMS, the inserts are in key-sequential order, and the insert is to the right-most data page.

Without application of the present invention and the right-most index page being full, an insert would result in the addition of a new root index page and a new index page to accommodate additional data pages. Concurrent inserts would not be allowed for the reasons set forth above for FIGS. 4A and 4B.

To allow multiple transactions to concurrently insert records in accordance with one embodiment, each data page is limited to storing only one record. An insert into the B+tree triggers preconditioning when the rightmost index page is full. In another embodiment, the preconditioning may also be used where multiple records are stored on a data page. Preconditioning in this scenario initiates a nested transaction that creates a new index page 512 and as many child data pages 514, 516, 518, and 520 as the index page can support (shown as n). The key values of the index records on the new index page 512 continue the sequence. Once these pages have been created, they are linked into the B+tree by updating the higher level index page to point to the newly created index page 512, and by updating the rightmost data page 508 of the existing B+tree to point, via link 540, to the leftmost data page 514 of the new empty data pages. In the example of FIGS. 5A and 5B, a new root index page 530 is also created to replace index page 510 as the root and to reference both index pages 510 and 512. The first entry 532 is updated with the key value n to refer to the last key of the last data page referenced by index page 510, and the second entry 534 is updated with the key value $2n$ to refer to the last key value of the last data page referenced by index page 512.

The nested transaction is completed by a commit operation. The commit of the nested transaction writes to an audit file in a mass storage arrangement, data that describes the new index pages 512, and 530, the new empty data pages 514, 516, 518, and 520, and the key values and links stored in the new pages. Data page 508 is written to the audit file as well because of its new link 540 which connects the old and new data pages. The updates may also be applied to the database file in a mass storage arrangement. After the nested transaction commit processing completes, the DBMS may proceed with inserting the next data record.

Once the B+tree has been preconditioned, concurrent transactions can insert, without updating the index page 512, until all the empty data pages 514, 516, and 518 have been used. An insert to page 520 would trigger additional preconditioning.

Table 2 describes the steps of the nested transaction for performing the dynamic preconditioning for the example illustrated in FIGS. 5A and 5B.

TABLE 2

Figure 6:
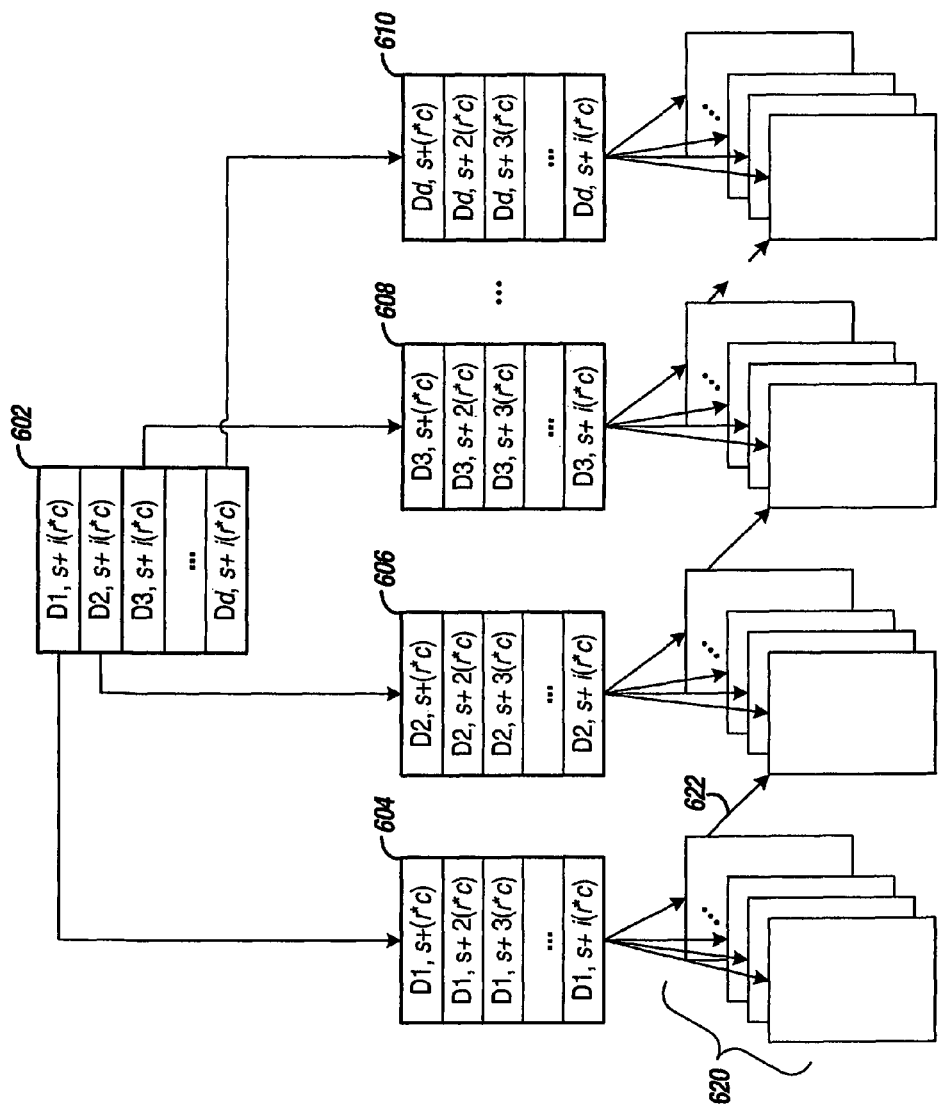
FIG. 6 illustrates a scenario in which an embodiment of the invention is applied to a database table that is divided into divisions.

Begin nested transaction
Calculate the number of key values which can fit onto an index page, i
Get the first number in the sequence, s and the increment value, c
Acquire a new index page
Acquire i data pages and link them together TABLE 2-continued Set the first data page's high value h to the first key value s
Populate the new index page with records:
    FOR rec_count := 1 TO i DO
        insert index record with key value h
        h := h + c
        Link new index record to corresponding data page
    END FOR
Link new subtree into existing B+ Tree in two steps:
    1) Link new index page into lowest level existing index page;
    in some cases a new parent must be created for the lowest,
    right-most index page and the new index page; and
    2) link the right-most data page of the existing B+ Tree to the
    left-most page of the new subtree
Commit nested transaction FIG. 6 illustrates a scenario in which an embodiment of the invention is applied to a database table that is divided into divisions. Each division has its own sequence. An example is a medical records database where the primary key is a composite key (multiple columns) consisting of a patient number and a date-seen. In this example, the leading key column identifies the division and date-seen column creates the sequence. The notation used in this scenario is Dx,y, where x is the division, and y the key value of a record within the division.

In the example scenario, the database table is initially empty as shown in FIG. 4A. There is one index page that is linked to an empty data page, and concurrent updates are not supported as explained. FIG. 6 illustrates the B+tree after preconditioning.

Dynamically preconditioning a database table having a composite key and records inserted in key-sequential order within a division does not require one data record per page as long as each division has its own set of data pages. If the divisions are accessed in a round-robin or other fashion and the transaction existence times are short enough to complete one insert before the next insert into the same division occurs, more than one record may be written to a data page. However, if collisions are likely to occur in inserting records to the same data page, the number of records on each data page must be limited to one as in the previous scenarios.

The first insert into the B+tree triggers preconditioning. If the DBMS determines that the database table is defined with a multi-column key (which indicates a division) and that key values are sequentially generated and records added in key-sequential order within each division, preconditioning of the B+tree may proceed with the initiation of a nested transaction. Preconditioning creates for each division, as many child data pages as the index page can support. The key values of the records on the index page reflect the division sequence, for example in division D1 the key values may be D1,1; D1,2; D1,3; . . . . The data pages are linked together but do not contain any records. The divisions are connected together to form a single B+tree.

The nested transaction is completed by a commit operation. The commit of the nested transaction writes to an audit file in a mass storage arrangement, data that describes the new index pages, the new empty data pages, and the key values and links stored in the new pages. The updates may also be applied to the database file in a mass storage arrangement. After the nested transaction commit processing completes, the DBMS may proceed with inserting the next data record.

The example of FIG. 6 illustrates a preconditioned B+tree for the case where multiple records may be written to a data page, and the key values in the index pages 602, 604, 606, 608, and 610 correspond to the variables used in the process steps set forth in Table 3. The number of divisions is d, the number of key values that can fit on an index page is i, the first key value in the sequence is s, the number of maximum-sized records that can fit in a data page is r, and the value by which the key values are incremented is c.

Each entry in the newly created index pages is linked to an empty data page. For example, for index page 604 there are i empty data pages 620. Each key value in the index page references the last key value possible on the linked empty data page. While not shown, it will be appreciated that the empty data pages under an index page are sequentially linked (the links from an empty data page from one division to another, for example, 622, are shown, however).

The number of divisions may be maintained as part of the DBMS's statistical information about the table, may be calculated based on the data in the table, or determined by some other means. The number of divisions may also be variable or fixed. For example, if the leading column of the key is patient record number, the number of divisions is the number of unique patients. If the leading column of the key is month, the number of divisions is 12.

Table 3 describes the steps of the nested transaction for performing the dynamic preconditioning for the example illustrated in FIG. 6.

TABLE 3

Figure 7A:
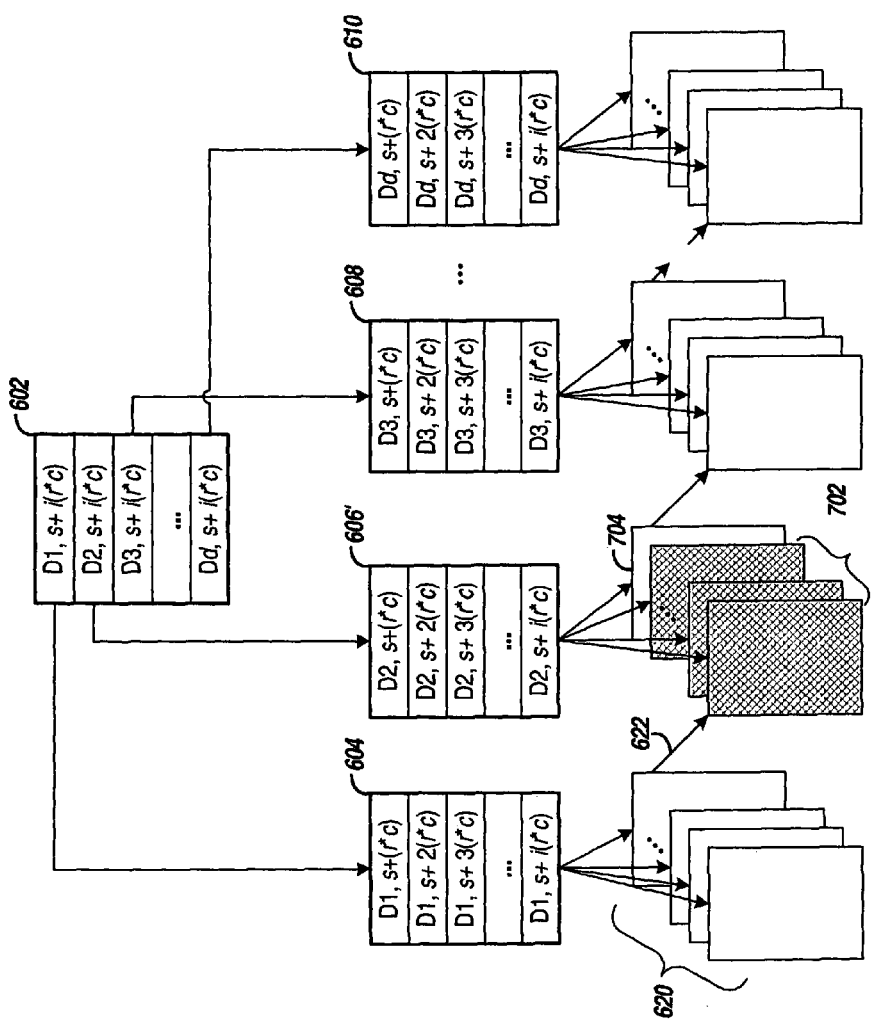
FIG. 7A shows the state of a database B+tree with all the data pages of an index page being full.
Figure 7B:
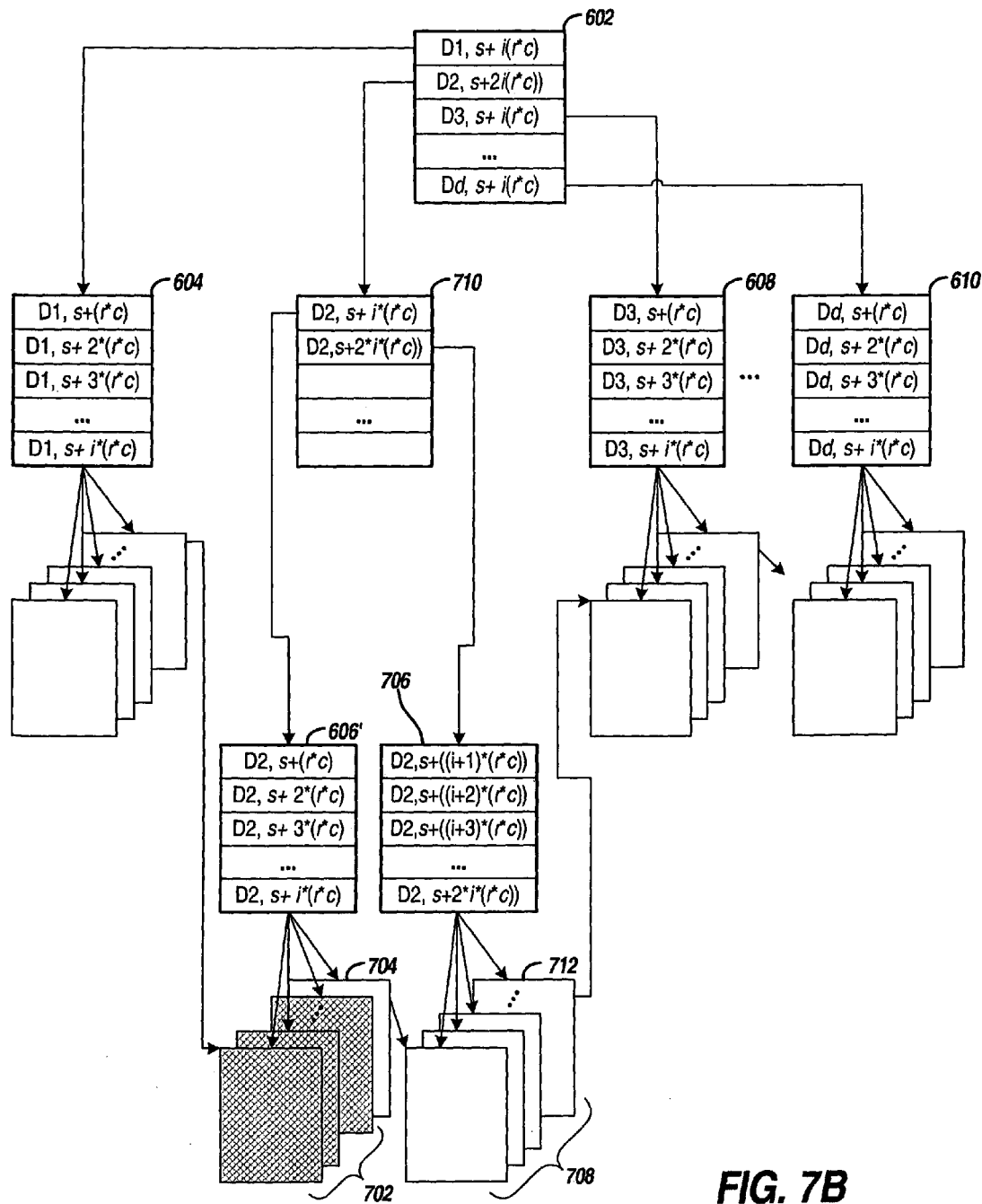
FIG. 7B shows the state of the B+tree after having been dynamically preconditioned in accordance with various embodiments of the invention.

Begin nested transaction
Calculate the number, r, of maximum-sized records that can fit in a data
   page
Calculate the number of key values which can fit onto an index page, i
Calculate the number of divisions, d
Get the first number in the sequence, s and the increment value, c
For each of the d divisions, calculate the first data page's high value, h
   (each entry in the index is the high value on the
     associated child page), $h = s + (r * c)$
For each of the d divisions, acquire an index page; the existing index
   page, page 1, created when the table is created, forms the root of
     the B+ Tree and is the parent of the d index pages
For each of the d divisions, acquire i data pages and link them together
   (Note that there is one data page already created when the table is
     created, as shown in FIG. 4A, so the total number of acquired
     pages is $(d * i) - 1$)
Process the already-created data page along with the newly acquired data
   pages
Populate each index page with records:
   FOR Dn := 1 TO d DO
     FOR rec_count := 1 TO i DO
       insert index record with key value Dn, h
       $h := h + (r * c)$
       Link new index record to corresponding data page
     END FOR
   END FOR
Link page 1, the root of the B+ Tree, to the d index pages
Commit nested transaction FIGS. 7A and 7B illustrate a scenario that is a variation of the scenario of FIG. 6 where some records have already been inserted in the B+tree and an insert is to the last data page of a right-most index page of a division. FIG. 7A shows the state of a database B+tree with the data pages 702 of index page 606' being full, as designated by the cross-hatching, and FIG. 7B shows the state of the B+tree after having been dynamically preconditioned in accordance with various embodiments of the invention.

The dynamic preconditioning illustrated by FIGS. 7A and 7B is triggered when an insert operation is detected by the DBMS, the inserts are in key-sequential order within a division, and the insert is to the last or right-most data page 704 within that division.

As with the other scenarios, the DBMS determines whether the database is in a state for preconditioning the B+tree in response to the initiation of a transaction that seeks to insert a record in the database. If the DBMS determines that the database table has divisions with records added in key-sequential order within each division, and the insert is to the last data page of the index page at which the insert is to occur, preconditioning of the B+tree may proceed with the initiation of a nested transaction.

A new index page 706 and child data pages 708 are created, and a new intermediate index page 710 is created for division D2 for linking the full index page 606' and the new index page 702 with the empty data pages 704 into the B+tree. It will be appreciated that once a record is to be inserted under division 2 in page 712, a new set of empty data pages may be created along with a new index page, and that new index page may be linked with existing index page 710, since index page 710 is not full.

The nested transaction is completed by a commit operation which writes data to an audit file to describe the updated pages. After the nested transaction commit processing completes, the DBMS may proceed with inserting the data record that triggered the preconditioning.

Table 3 describes the steps of the nested transaction for performing the dynamic preconditioning for the example illustrated in FIGS. 7A and 7B.

TABLE 4

Begin nested transaction
Calculate the number of maximum-sized records which can fit onto a data
   page, r
Calculate the number of key values which can fit onto an index page, i
Get the next number in the sequence for this division, s and the increment
   value, c
Calculate the next data page's high value, h for this division (each entry in
   the index is the high value on the associated child page),
     $h = s + (r * c)$
Acquire i data pages and link them together
Acquire a new index page
Populate the new index page with records:
   FOR rec_count := 1 TO i DO
     insert index record with key value dn, h
     $h := h + (r * c)$
     Link new index record to corresponding data page
   END FOR
Link new subtree into existing B+ Tree in two steps:
   1) Link new index page into lowest level existing index page;
     in some cases a new parent must be created for the lowest,
     right-most index page and the new index page; and
   2) link the right-most data page of the existing B+ Tree to the
     left-most page of the new subtree; and link the rightmost
     data page in the new subtree to its successor data page
Commit nested transaction.

Figure 8:
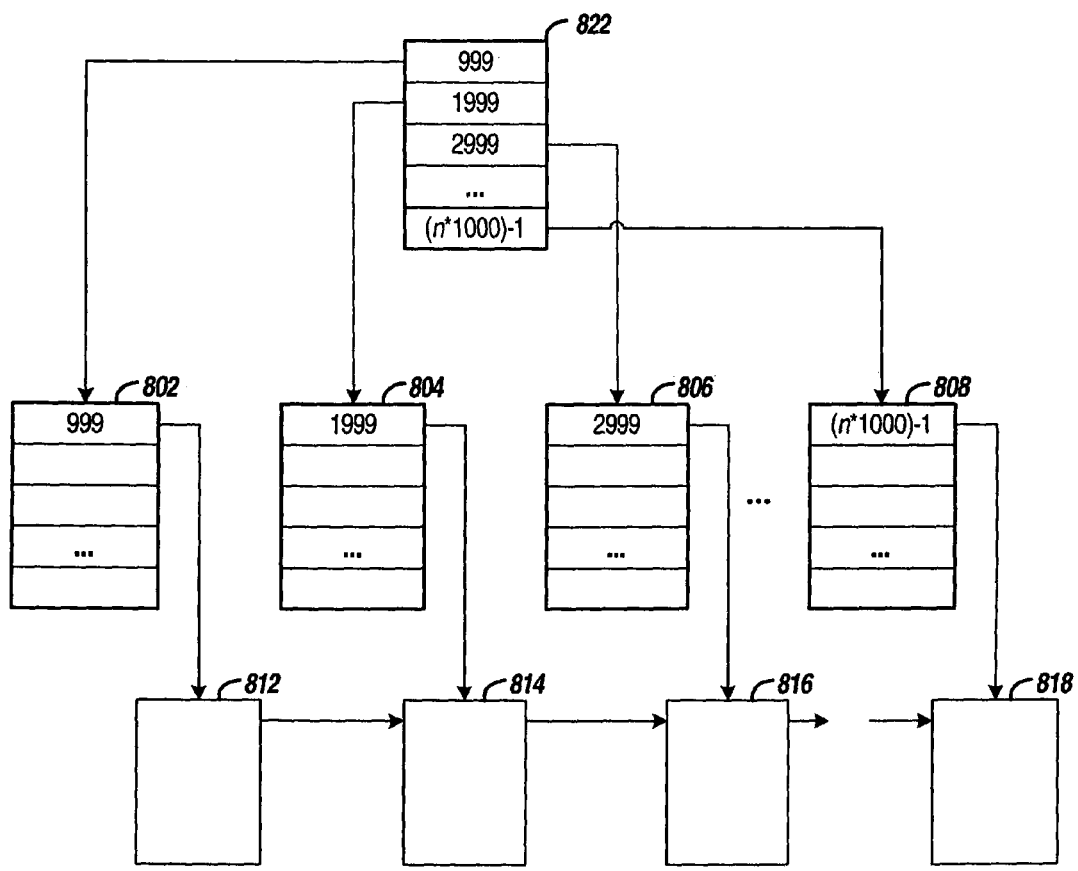
FIG. 8 illustrates a preconditioned B+tree for the case where the B+tree for an initially empty database table has been preconditioned for inserting records in random key order.

The example of FIG. 8 illustrates a preconditioned B+tree for the case where the B+tree for an initially empty database table has been preconditioned for inserting records in random key order. In the example scenario, the database table is initially empty as shown in FIG. 4A. There is one index page that is linked to an empty data page, and concurrent updates are not supported as explained. FIG. 8 illustrates the B+tree after preconditioning.

The first insert into an initially empty B+tree triggers preconditioning. In response to the DBMS determining that key values are randomly generated, preconditioning of the B+tree may proceed with the initiation of a nested transaction.

The preconditioning divides the domain of possible key values into a number of divisions. The number of divisions could, for example, be the maximum number of records that fit on an index page. The domain is the possible set of values for a given column. For example, if the column definition contains "CHECK BETWEEN 0 and 9999" the possible key values are between 1 and 9999. Or when the data type is "NUMERIC (4,0)" the key may have values between −9999 and 9999. Since use of negative key values is rare, the negative values may be ignored for purposes of preconditioning. For a key range of 0-9999, ten divisions having key values of 999; 1999; . . . 9999 may be used. Each division has a single index page (illustrated with index pages 802, 804, 806, and 808) and a single empty data page (illustrated with index pages 812, 814, 816, and 818). The root index page 822 is updated to contain the key values corresponding to the divisions and linked to the index pages 802, 804, 806, and 808. As with the previous scenarios, if collisions might occur when writing to a data page, the number of records per data page must be limited to one. This example illustrates the case where multiple data records can be written to a data page without collisions.

The nested transaction is completed by a commit operation which writes data to an audit file to describe the updated pages. After the nested transaction commit processing completes, the DBMS may proceed with inserting the data record that triggered the preconditioning.

Table 5 describes the steps of the nested transaction for performing the dynamic preconditioning for the example illustrated in FIG. 8.

TABLE 5

Begin nested transaction
Calculate the number of maximum-sized records which can fit onto a data
    page, r
Calculate the number of divisions, d
Get the first number in the sequence, s and the increment value, c
For each of the d divisions, calculate the first data page's high value,
    h (each entry in the index is the high value on the associated child
    page), h = s + (r * c)
For each of the d divisions, acquire an index page; the existing index
    page, page 1, created when the table is created, forms the root of
    the B+ Tree and is the parent of the d index pages
For each of the d divisions, acquire a data page and link them together;
    note that there is one data page already created when the table is
    created so the total number of acquired pages is (d * i) − 1
Process the already-created data page along with the newly acquired data
    pages
Populate each index page with one record:
    FOR Dn := 1 TO d DO
        insert index record with key value h
        h := h + (r * c)
        Link new index record to corresponding data page
    END FOR
Link page 1, the root of the B+ Tree, to the d index pages
Commit nested transaction.

Figure 9A:
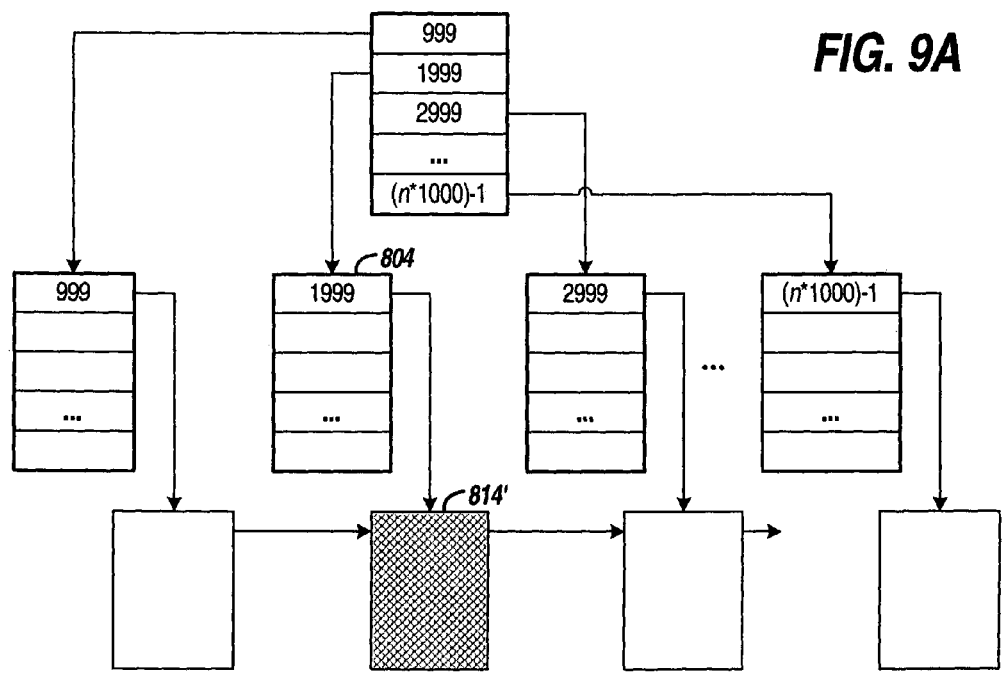
FIG. 9A shows the state of a database B+tree with a single data page of an index page being full.
Figure 9B:
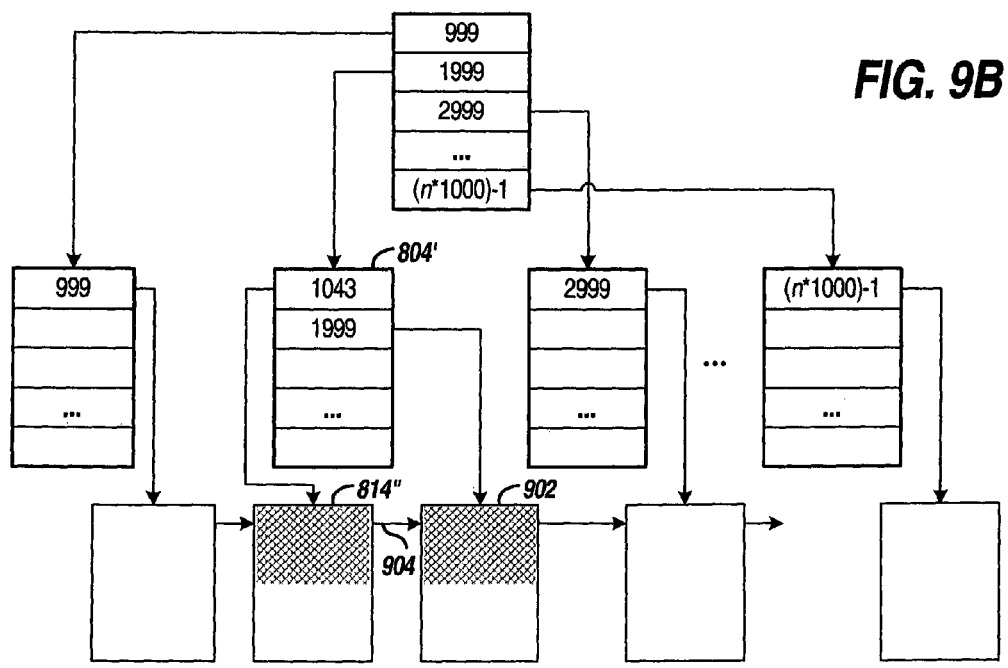
FIG. 9B shows the state of the B+tree after having been dynamically preconditioned in accordance with various embodiments of the invention.

FIGS. 9A and 9B illustrate a scenario that is a variation of the scenario of FIG. 8 where some records have already been inserted in the B+tree and the data page in which a record is to be inserted is already full of data records. It may be recalled from the example of FIG. 8 that each data page holds multiple data records. FIG. 9A shows the state of a database B+tree with data page 814' of index page 804 being full, as designated by the cross-hatching, and FIG. 9B shows the state of the B+tree after having been dynamically preconditioned in accordance with various embodiments of the invention.

The dynamic preconditioning illustrated by FIGS. 9A and 9B is triggered when an insert operation is detected by the DBMS, the inserts are in random key order, and the data page in which the record is to be inserted is full. As with the other scenarios, the DBMS determines whether the database is in a state for preconditioning the B+tree in response to the initiation of a transaction that seeks to insert a record in the database. If the DBMS determines that the key values are generated randomly and the data page in which the insert is to occur is full, preconditioning of the B+tree may proceed with the initiation of a nested transaction.

When the table contains a large number of data pages, the chance multiple transactions update different records on the same page may be relatively small. However, page splits will occasionally update the same index page and limit concurrency. To handle this, the page split is performed by preconditioning. This preconditioning happens before the transaction has updated the page. As shown in FIG. 9B, a new data page 902 is created, and the records from the old data page 814' are split between the old data page 814' to the new data page 902. The new data page is linked 904 into the B+Tree to the right of the old data page. The parent index page of the split index page is updated to reflect this page split. For example; index page 804 of FIG. 9A is updated to have in the first entry key value 1043 (the highest key value of a record in data page 814") and have in the second entry the key value 1999 (the highest possible key value for the division) as illustrated by index page 804' of FIG. 9B. The preconditioning updates are committed. The index page is now available for update by other transactions.

As with the previous scenarios, if collisions might occur when writing to the data page, the number of records per data page must be limited to one. This example illustrates the case where multiple data records can be written to a data page without collisions.

Table 6 describes the steps of the nested transaction for performing the dynamic preconditioning for the example illustrated in FIGS. 9A and 9B.

TABLE 6

Begin nested transaction
Calculate the number of maximum-sized records which can fit onto a data
    page, r
Acquire a new data page
Calculate the page split point according to some method; for example,
    determine a split point where half the records remain on the original
    data page, and half the records move to the new data page
Move the records after the split point to the new data page
Determine the high record value on the original page following the split
Link new data page into existing B+ Tree in two steps:
    1) Link new index page into lowest level existing index page;
    in some cases a new parent must be created for the lowest,
    right-most index page and the new index page; and
    2) link the right-most data page of the existing B+ Tree to the
    new data page; and link the new data page to its successor
    data page
Commit nested transaction The foregoing description is based on a database application in which the key changes sequentially in adding new records. In other applications, however, the key value may grow by random intervals. For example, the key value may be date, time, timestamp, spatial or some other user defined data type. Whereas a sequence of sequentially increasing key values may be 101, 102, 103, 104, . . . , a key sequence based on a random interval such as a timestamp might be: 08:12:53.123456, 08:12:53.789123, 08:13:22.431298, . . . . Thus, a group of sequential timestamp values cannot be used in preconditioning the B+tree.

Relative to embodiments of the present invention, where a key is based on multiple columns ("multi-column key") of a database table, the database table may be preconditioned even if those keys do not increase sequentially. In describing the embodiments of the invention, a banking application is presented as an example in which a multi-column key contains a date and an account number column. In the example, the date may increase sequentially, but the application may assign account numbers that do not increase sequentially. The specific examples are provided for purposes of illustration, and those skilled in the art will recognize that the embodiments of the invention are applicable beyond the specific examples described herein.

Figure 10:
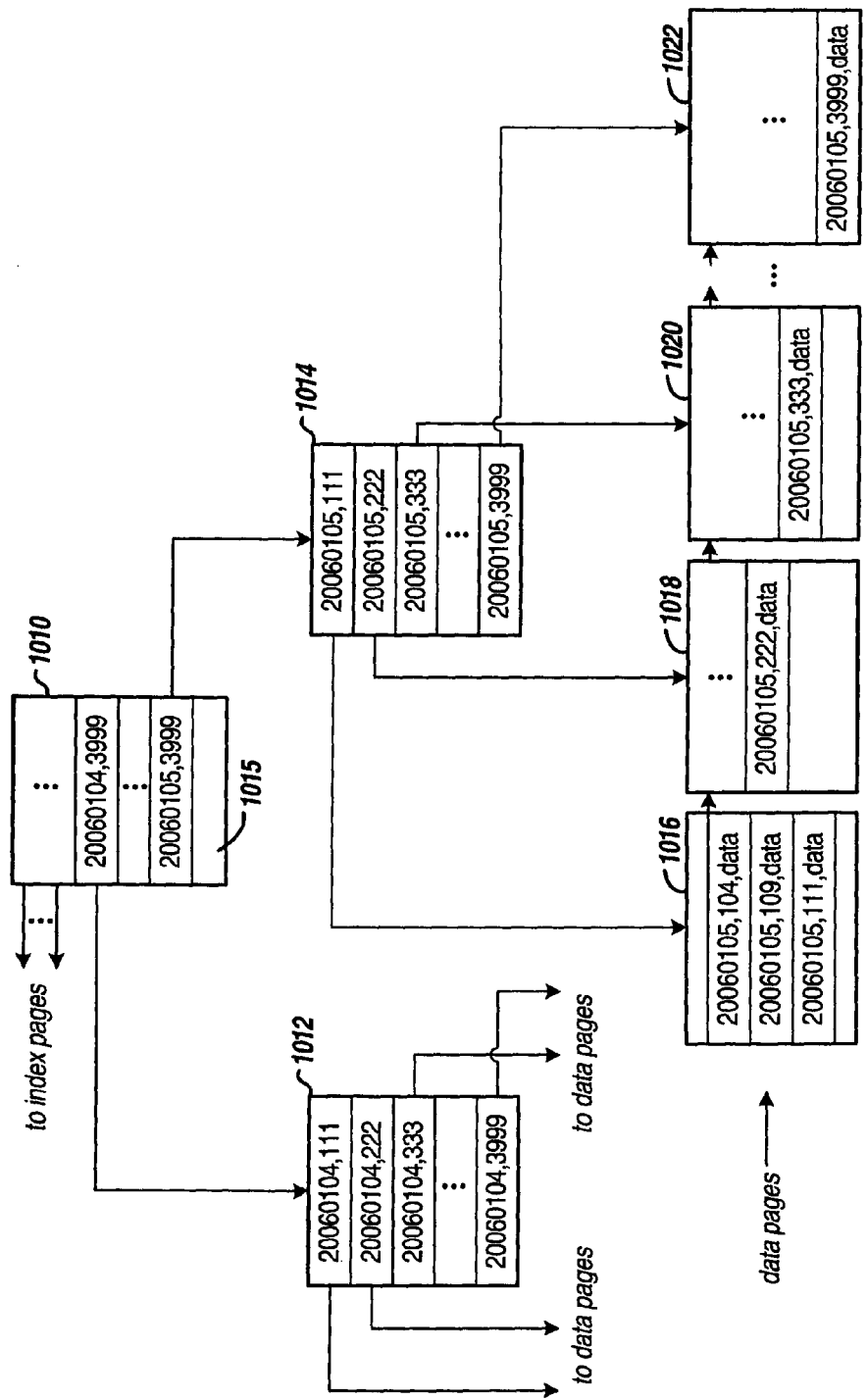
FIG. 10 shows an example B+tree having a key that includes a date and account number.

FIG. 10 shows an example B+tree having a key that includes a date and account number. Blocks 1010, 1012, and 1014 are index pages, and blocks 1016, 1018, 1020, and 1022 are data pages. The index records in the index pages show example values for a multi-column key. For example, the two illustrated example key values in index page 1010 are 20060104,3999 and 20060105,3999. Index page 1010 has space for additional index records as indicated by space 1015.

In the example application, when a new record is added, the current date and account number form the multi-column key for that record and are used together to determine the location in the B+tree at which the record is to be inserted. Thus, if the current date is 20060105 and the account number is 150, the new record may be inserted in an empty slot in data page 1018.

Assuming that index page 1014 is full, when the date changes to 20060106 and a new record is to be added, that new record will be inserted into a new data page. In addition, since index page 1014 is full, a new index page must be added to accommodate the new index record having the new date. If only a single new index record were created, concurrency may be reduced until enough index page splits are performed and data pages added to the B+tree that the likelihood is reduced that concurrent transactions would seek to place records on the same data page.

In order to address this situation, the B+tree may be preconditioned by predicting the multi-column key values to use in the new index pages based on the key values previously used. A nested transaction is automatically initiated to precondition the database when the new record is added. In the current example, it may be inferred that some number of records will be added using the current new date of 20060106. The DBMS may recognize from the declaration of one of the columns of the key that the value is a date. Since the date will not change for 24 hours, 20060106 may be safely used in the left side key column for some added number of index records. For predicting the right side key column value, in one embodiment it may be assumed that the right side key column values will be similar to those from the previous day. Thus, in one embodiment, a portion of the B+tree structure from the previous day is replicated, with empty data pages, using the current date and copying the right side key column values.

Figure 11:
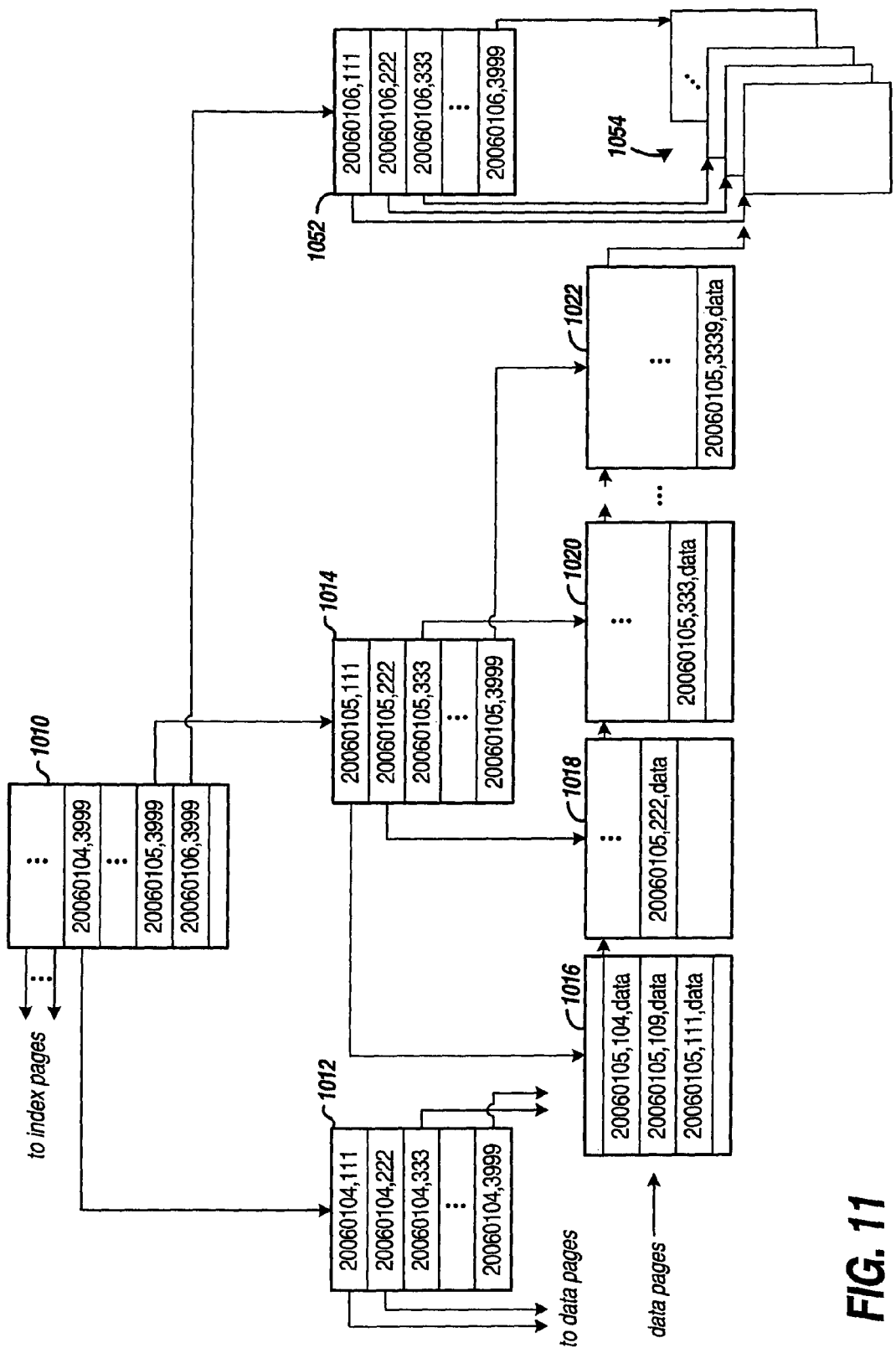
FIG. 11 shows an example B+tree in which a portion of the tree from the previous day has been replicated.

FIG. 11 shows an example B+tree in which a portion of the tree from the previous day has been replicated. The replication illustrated in FIG. 11 continues the example from FIG. 10. Replication may be suitable for use in preconditioning when the right side of a multi-column key does not change sequentially. For non-sequential right side column values of a key, the precise values that will eventually be inserted may not be amenable to predicting with 100% certainty. Copies of a previous set of right side values may provide a reasonable approximation.

Because index page 1014 was full, a new index page 1052 was added and linked to index page 1010 with the new index record having the multi-column key value, 20010106,3999, which indicates the last multi-column key value in the portion of the tree below index page 1052.

In this example, the index record is the highest value which may appear on the child page. In other embodiments, the index record is the lowest value which may appear on the child page. Also, note that the index record value is the highest value which "may" appear on the child page. A data page having a record with the actual value might never be added to the database. The search strategy during tree traversal performs correctly whether the actual value appears on a child page or not. Over time, these predicted index record values are augmented by actual values as data page splits occur over the course of time. Thus, the replicated portion of the B+tree changes over time and continues to reflect the pattern in the data records even if the pattern in the data records changes over time.

In the example, the part of the B+tree having records keyed with the date from the previous day is replicated as shown by index page 1052. The right side part of the multi-column key value is copied from each of the index records in index page 1014 to the corresponding index records in index page 1052. In the example, the right side key values 111, 222, 333, . . . 3999 are copied. The index records in index page 1052 point to empty data pages 1054.

Once the new index pages 1050 and 1052 and data pages 1054 are committed by the nested transaction, the transaction that triggered the preconditioning may be completed. After being preconditioned, multiple transactions may now concurrently insert records under the index page 1052 because there is a distribution of empty data pages 1054 in which to add records.

Table 7 describes the steps of the nested transaction for performing the dynamic preconditioning for the example illustrated in FIGS. 10 and 11.

TABLE 7

Begin nested transaction
Calculate the number of key values which can fit onto an index page, i
Get the next value in the pattern for the leftmost key column, $k_1$
Acquire a new index page
Acquire i data pages and link them together
Populate the new index page with records:
    FOR rec_count := 1 TO i DO
        generate next h by getting the next key column values from
            the portion of the B+tree being replicated $k_2$, $k_3$, ..., $k_n$
        $k_1$ remains constant
        insert index record with key value h in the index page at
            position i
        link new index record to corresponding data page
    ENDFOR
Link new subtree into existing B+ Tree as in Table 2

As with various ones of the scenarios described in association with FIGS. 4A-9B, the preconditioning is triggered when an index page is full and a new data record is to be added, and the preconditioning is performed in a nested transaction within the triggering transaction. The number of key values, i, that can fit on an index page is determined for purposes of generating new key values and initializing the new index page. The value of the leftmost key column, $k_1$, is obtained for the new set of index records. For the scenario in which a part of the B+tree is replicated, the values for the other key columns $k_2$-$k_n$ may be obtained from the part of tree being replicated. A new index page is acquired for storing the new key values, and i new empty data pages are acquired to be linked to the index records. The FOR loop sets up the new index records in the new index page, first by assigning the key value, h, then generating the next key value, and then linking the index record to the corresponding data page. It will be appreciated that the next h has the same $k_1$ while the other column values of the key are changed per the corresponding values from the portion of the tree being replicated.

Figure 12:
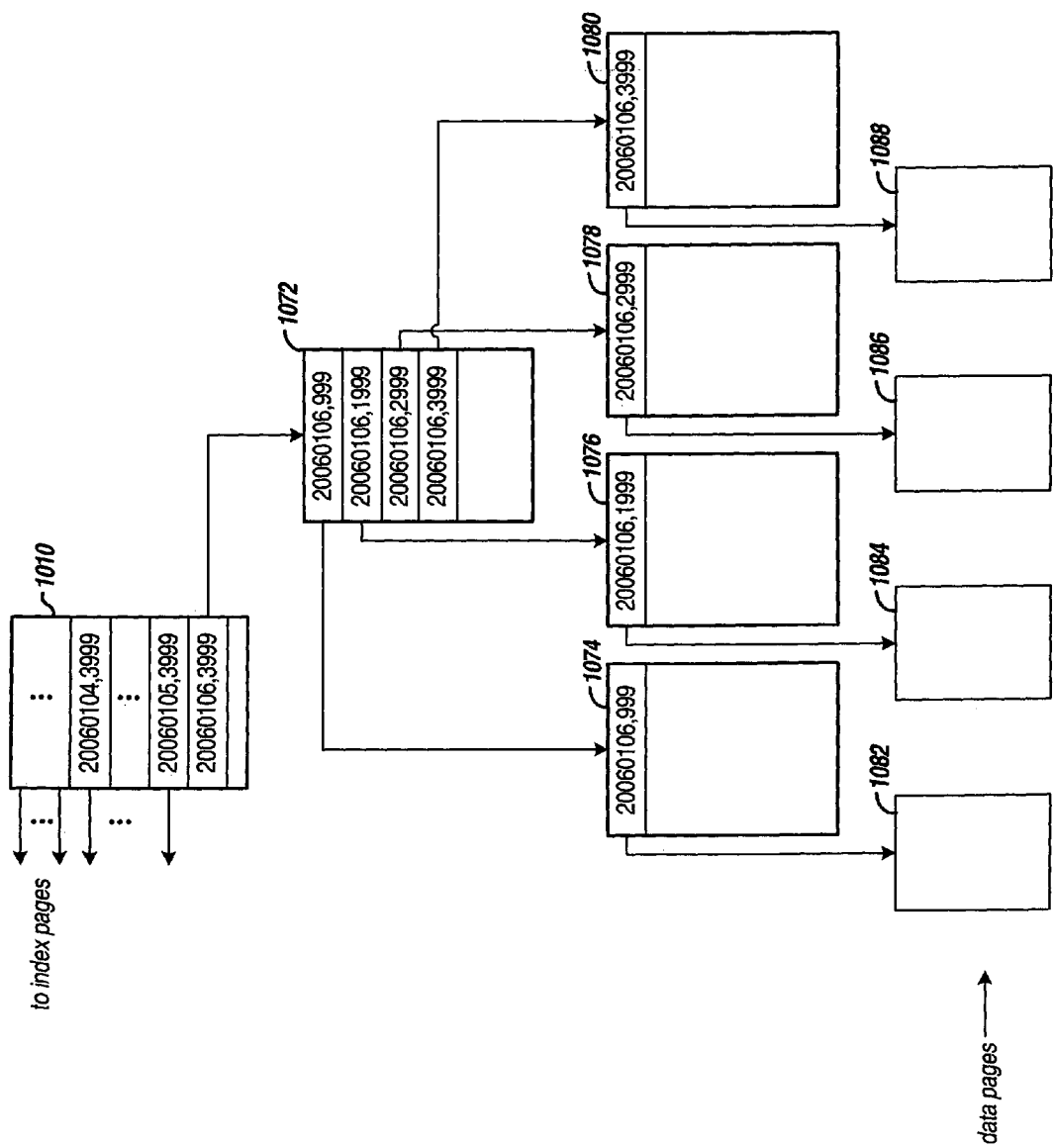
FIG. 12 shows an example B+tree that has been preconditioned using divisions of multi-column key values.

FIG. 12 shows an example B+tree that has been preconditioned using divisions of multi-column key values. The example of FIG. 12 illustrates the approach taken by an embodiment of the invention that addresses a situation in which there are too many index pages and data pages to replicate in a nested transaction within a reasonable amount of time. For example, there may be millions of pages to replicate and it may not be practical to generate that many pages in the tree within a nested transaction. To address this scenario, the range of possible multi-column key values is divided into multiple divisions.

A new index page 1072 is created as in the example of FIG. 11. However, instead of generating a fully populated index page 1052 as in FIG. 11, a partially populated index page 1072 is created with four index records, each corresponding to a range of the multi-column key values and representing one of the divisions. Under index page 1072, new index pages 1074, 1076, 1078, and 1080 are created to correspond to the divisions, and respective single empty data pages 1082, 1084, 1086, and 1088 are created under each of those index pages.

The use of divisions greatly reduces the number of pages added to the preconditioned B+tree. For example, if there were space for 100 records per index page and only one index record and one corresponding empty data page were created in the preconditioning, then the preconditioning is $\frac{1}{100}^{th}$ of the preconditioning scenario in which an index page is fully populated (instead of creating 100,000 data pages only 1000 data pages would be created).

Figure 13:
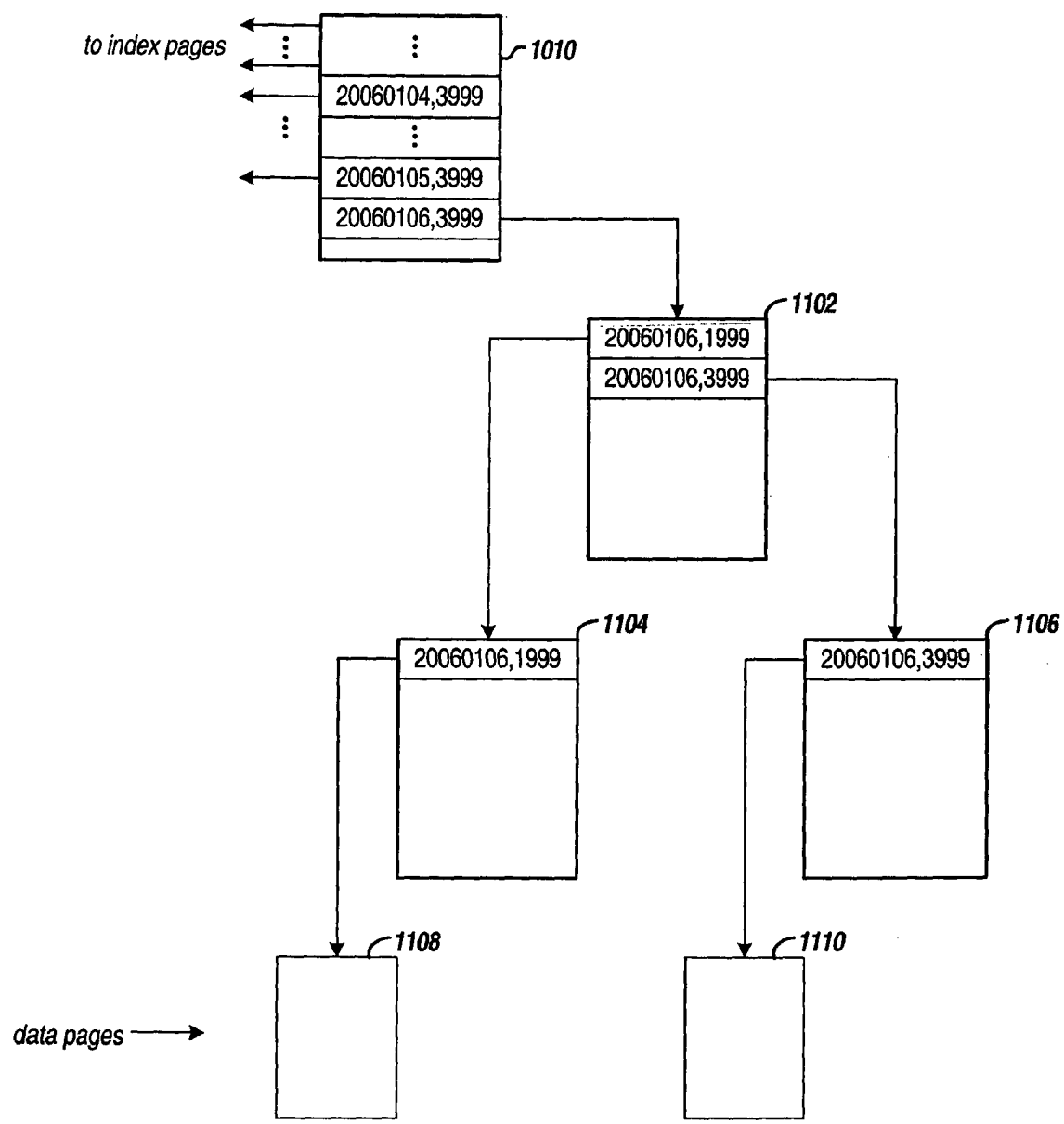
FIG. 13 shows an example B+tree that has been preconditioned using divisions of multi-column key values having a reduced number of divisions in a second level index page to reduce the number of pages added to the preconditioned B+tree.

FIG. 13 shows an example B+tree that has been preconditioned using divisions of multi-column key values having a reduced number of divisions in a second level index page to reduce the number of pages added to the preconditioned B+tree. Relative to the example of FIG. 12, if reducing the number of index records on the first level index page to one does not sufficiently reduce the number of pages to be added to the B+tree, then the number of index records in the second level index page may be reduced. (The first level index pages are those that reference data pages and the second level index page is the index page that references the first level index pages and so on up to the root index page.)

In preconditioning, the new second level index page 1102 contains only two index records, for which there are respective new first level index pages 1104 and 1106. The new first level index pages reference new data pages 1108 and 1110, respectively. Those skilled in the art will recognize that this reduction in index records may be applied to higher levels in the B+tree to further reduce the number of pages added to the preconditioned B+tree (even though the example B+tree shows only first, second and root level index pages).

Figure 14:
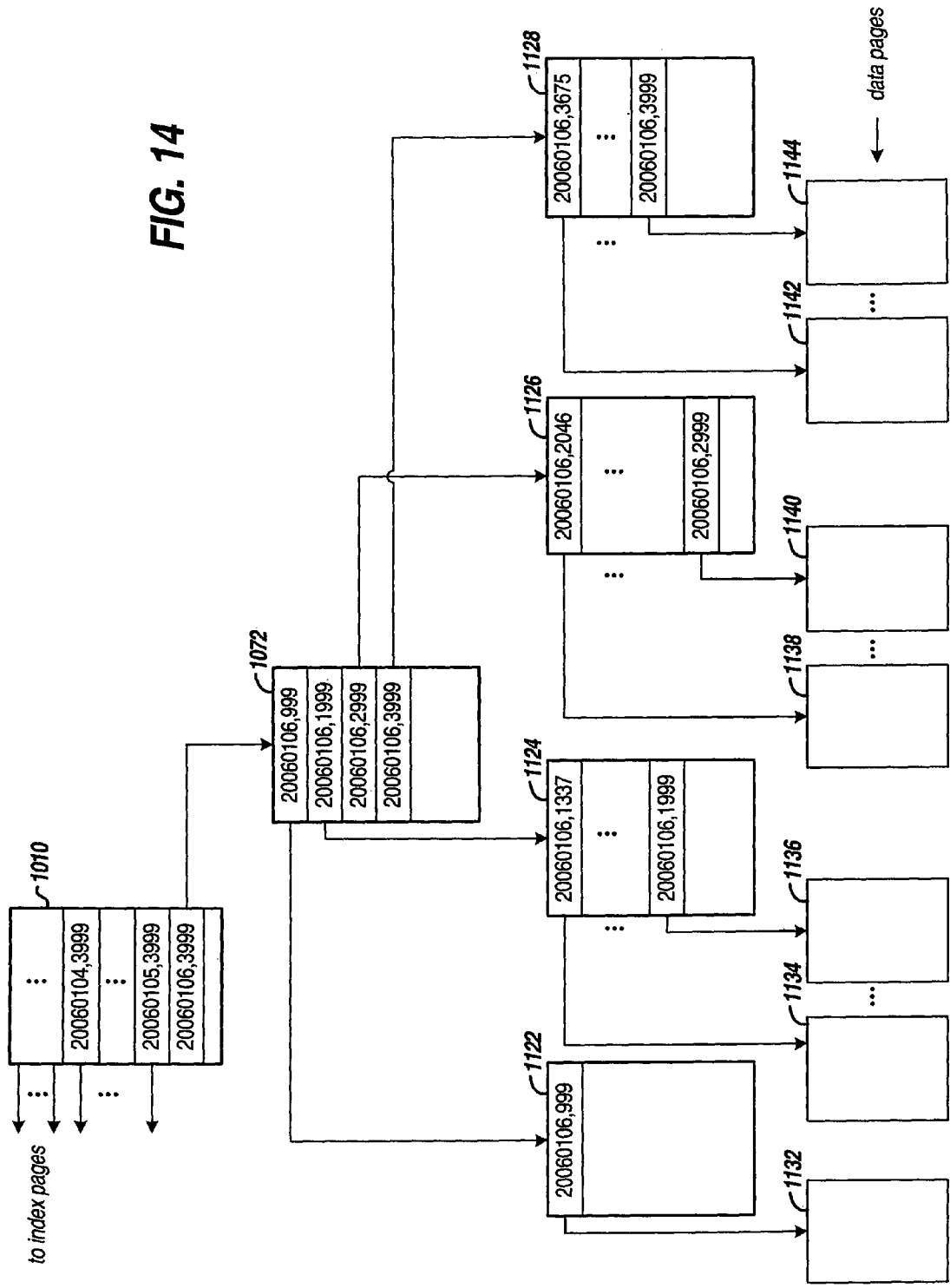
FIG. 14 shows an example B+tree that has been preconditioned using divisions of multi-column key values and having random numbers of data pages under each first level index page.

FIG. 14 shows an example B+tree that has been preconditioned using divisions of multi-column key values and having random numbers of data pages under each first level index page. The preconditioned B+tree of FIG. 14 is similar to that of FIG. 12 with the difference being that the first level index pages 1122, 1124, 1126, and 1128 have random numbers of index records corresponding to data pages 1132, 1134, 1136, 1138, 1140, 1142, and 1144. The diagram is intended to convey that index pages 1122, 1124, 1126 and 1128 have different numbers of index records (e.g., page 1122 has fewer index records than index page 1128, which has fewer index records than index page 1124, which has fewer index records than index page 1126).

By creating random numbers of index records in the first level index pages, the data pages referenced by those index pages would be filled at different times, and preconditioning under the first level index pages would be performed at different times, thereby more evenly distributing the use of system resources over time.

Figure 15:
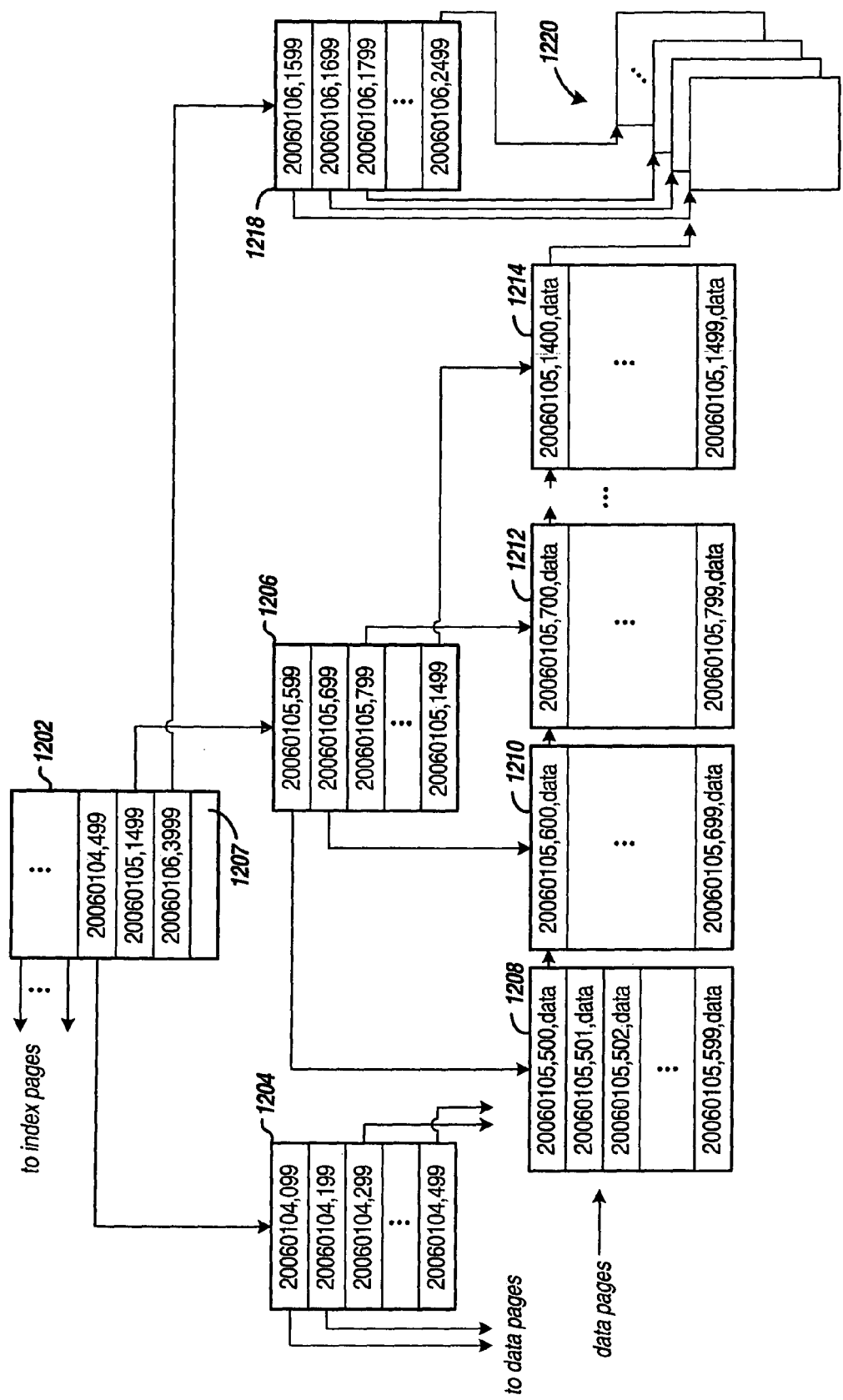
FIG. 15 shows an example B+tree that has been preconditioned by predicting the key values of a multi-column key.

FIG. 15 shows an example B+tree that has been preconditioned by predicting the key values of a multi-column key. In some database applications it may be possible to predict the values of all the columns in a multi-column key without looking at the records already in the table. An example application is a two column key in which the left column is a date (or some other slowly changing sequence) and the right column is an IDENTITY or some other type recognized to change sequentially with each new record. An example sequence of multi-column key values in successive data records in this type of scenario is: 20060105, 501; 20060105, 502; 20060105, 503; . . . .

If the application declares the left column with the DATE data type and includes the clause, GENERATED BY DEFAULT AS (current_date), the DBMS can predict the date value to use in the multi-column key values in the index records to be added in preconditioning. Since the right column changes sequentially, the values used in the right part of the multi-column key in the index records are also predictable. Thus, the B+tree may be preconditioned with a selected number of data pages and accompanying index records when an index page needs to be split (and also when the first record is added).

Prior to preconditioning, the example B+tree included index pages 1202, 1204, 1206 and data pages 1208, 1210, 1212, and 1214. Index page 1202 has space for additional index records as shown by space 1207. From the illustrated multi-column key values in the data pages 1208, 1210, 1212, and 1214 it may be observed that the right column part of the key increases sequentially. Thus, index page 1218 and data pages 1220 are added with the preconditioning.

The preconditioning is triggered with the next record to be added, which has a multi-column key value of 20060106, 1500. Since both data page 1214 and index page 1206 are full, the B+tree structure needs to be modified to accommodate the new record. The tree is preconditioned with the addition of new index page 1218, which references new data pages 1220. The multi-column key values in the new index records in index page 1218 are based on the number of data records per data page with the right side of the key value increasing sequentially.

Figure 16:
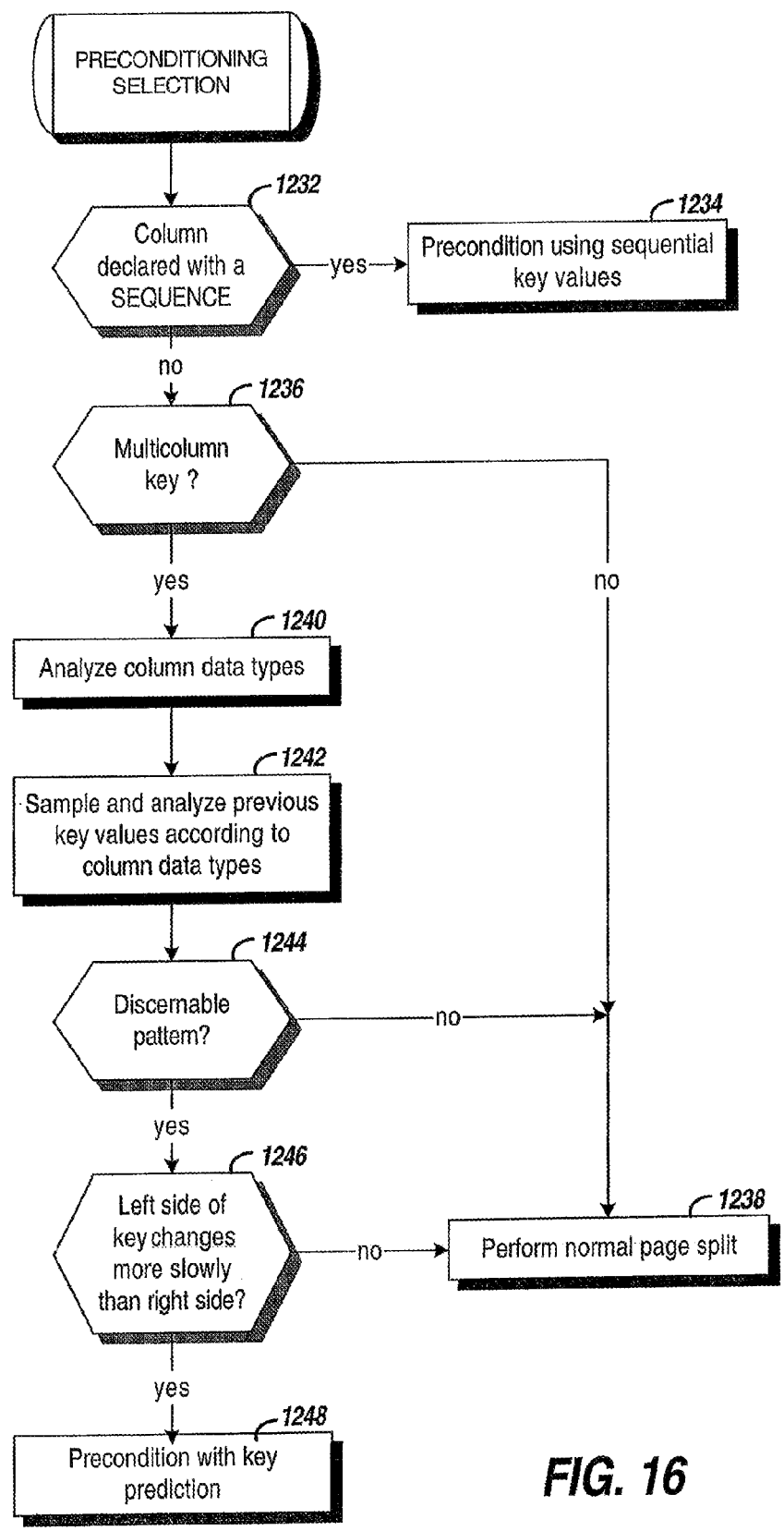
FIG. 16 is a flowchart of an example process for selecting a preconditioning method in accordance with various embodiments of the invention.

FIG. 16 is a flowchart of an example process for selecting a preconditioning method in accordance with various embodiments of the invention. In one embodiment, the invention uses the process in FIG. 16 when the first preconditioning occurs and saves the analysis result to use each subsequent time that preconditioning occurs. In another embodiment, the invention uses the process in FIG. 16 each time preconditioning occurs to adjust the preconditioning as the pattern of key values actually used in records changes over time.

If the key column is declared with a SEQUENCE (decision step 1232), then the preconditioning approaches shown and described in FIGS. 4A-9B may be applied (step 1234). Otherwise, the process checks for a declared multi-column key (decision step 1236). If a multi-column key is not declared, then the DBMS splits the index page without preconditioning (step 1238). If a multi-column key is declared, whether the key values exhibit a suitable pattern for preconditioning is determined (steps 1240, 1242, and 1244).

In one embodiment, the analysis looks only for DATE and TIMESTAMP data types in the first key column to determine whether there is a pattern in the index values; the presence of either DATE or TIMESTAMP data types for the first key column is a sufficient pattern. In other embodiments, combinations of column data types are sought to determine a pattern in the index values. If the data types of the columns included in the key do not meet the processing criteria, then the previous key values are not sampled (step 1242), there is no discernable pattern (decision step 1244), and the DBMS splits the index page without preconditioning (step 1238).

If a multi-column key is declared, then the data types of the columns in the key and declared constraints are analyzed (step 1240) to tailor the sampling of previous key values (step 1242). If any of the column types is DATE or TIMESTAMP, the previous key values are sampled looking for a sequence (e.g., the DATE/TIMESTAMP column value remains the same for some number of records, and then changes and remains the same for some number of records, etc.) of dates in the previous key values. If any of the column types has a constraint (e.g., NUMERIC(4) GE 0), the range of values is known (e.g., $0<=X<=9999$). The analysis in step 1240 determines what patterns might occur in the key values and guides the sampling done in step 1242.

In steps 1240 and 1242, to determine the pattern, the DBMS uses the values in the record being inserted on the right-most data page of the B+tree, the values in the right-most record of the B+tree, and a portion of the index records above and to the left of the record being inserted. For example, if a multi-column key is composed of columns $k_1$, $k_2, \ldots, k_n$, where $k_1$ is the left-most column in the key and column $k_1$ is referred to $k_i$ where i=1, then DBMS compares the key values of the record being inserted against those of the right-most record in the B+tree. Assume column $k_d$ is the left-most column whose value is different (columns $k_i$ where i>=1 and i<d have the same value). If there is an invariant part of the multi-column key, it is columns $k_j$ (where j>=1 and j<=d). Next, determine if the number of index pages containing value of the invariant part is "large enough" to warrant preconditioning. Note that an exact count of the number of pages for each invariant division is not required (i.e., where all records have the value of k; where j>=1 and j<=d equal to the value of the right-most record of the B+tree). If the number of pages is larger than some threshold, the number of invariant pages is "large enough". For example, the threshold could be set to the maximum number of data pages which are part of a fully populated 2-level B+tree with this key-definition (a 2-level B+tree has two levels of index pages and a single level of data pages, and an index page at level 2 points to index pages level 1 which point to data pages). An example heuristic is as follows: if there are three records in the level 3 index page with the same value, then there are at least two level-2 pages with keys containing this value; if there are two records in the level 4 (or higher) index page with the same value, then there are at least two level-2 pages with keys containing this value. The "easy" way to determine this number of index pages in range is to search the B+tree for the first record of the invariant key-column range ($k_j$=value from right-most record where j>=1 and j<=d), save the logical position of this record in each level of index page, and compare this logical position to the logical position belonging to right-most record. Other thresholds are possible and indeed probable. Note that the right-most record of the key in each index page is a sentinel record with a value of infinity (or negative infinity) for each key column.

For example, suppose there exists an INDEX on TIME ($k_1$ column is TIME). Each record probably has a unique value of TIME. A B+tree search for the left-most record with the TIME value from the right-most record in the B+tree will land on the right-most record in the B+tree. Therefore the distance (number of pages) between the logical left-most and logical right-most page in the proposed invariant part of the B+tree is zero. This B+tree is not a candidate for preconditioning with key prediction.

In another example, in which the INDEX is on DATE, the DBMS searches for the left-most record with the same value as the date in the right-most record. If the logical distance in the level y (y>=4) index page is >=2, then the B+tree is a candidate for preconditioning using replication. If the logical distance in level 3 is >=3, then the B+tree is a candidate for preconditioning using replication. For example, if the logical distance on the level 4 page was 2, then there are at least two level 2 index pages filled with the same date value.

While complex patterns may appear in key values, oftentimes the pattern is simple (e.g., next date, next day of the week Monday . . . Friday, increment by 1, increment by 5, etc.). In one embodiment, the DBMS searches for the pattern. In another embodiment, the database administrator tells the DBMS the expected pattern using a declarative mechanism.

A special case happens at step 1242 when the table is empty; there are no existing index values from which to sample. In this case, the DBMS skips to step 1248 and uses the leftmost key value in the record being inserted as the value for $k_1$ and generates possible values for the key columns $k_2, \ldots, k_n$ based on the domain of possible values. For each key column $k_x$, generate as many values as will fill an index page $k_{x-1}, k_{x-2}, \ldots, k_{x-i}$ across the domain of possible values. For example, if the data type and constraint of column $k_2$ is NUMERIC(4) GE 0, and the number of values/which will fill an index page is 100, the DBMS generates the set of values for $k_2$ as $k_{2-1}$=99, $k_{2-2}$=199, $k_{2-3}$=299, $k_{2-100}$=9999. This is shown in Table 8. If the number of index pages and data pages is too large to generate in a reasonable amount of time, the DBMS uses divisions of the domain values as illustrated in FIG. 12, FIG. 13, and FIG. 14.

TABLE 8

Begin nested transaction
Calculate the number of key values which can fit onto an index page, i
Use the value in the record being inserted for the leftmost key column, $k_1$
Acquire a new index page
Acquire i data pages and link them together
Analyze the domain of possible values for each key column $k_2, \ldots, k_n$ and
    determine the list of i values $k_{x-1}, \ldots k_{x-i}$ to generate for the column
Populate the new index page with records:
    FOR rec_count := 1 TO i DO
        generate next h by getting the next key column value
    for
        each column determined above $k_1$ (which remains
            constant), $k_{2-rec\_count}, k_{3-rec\_count}, \ldots, k_{n\ rec\_count\ i}$
        insert index record with key value h in the index page at TABLE 8-continued

```
        position i
        link new index record to corresponding data page
    ENDFOR
    Link new subtree into existing B+ Tree (as in Table 2)
```

If a pattern was found in the sampled multi-column key values (decision step 1244), then the process checks whether the sampled multi-column key values have a left side of the key value that changes more slowly than a right side of the key value (decision step 1246). That is, both the left side and right side are found to change over the entire set of sampled values. But the right side of the key is found to change from one data record to the next, whereas the left side is found to stay the same for two or more successive data records before changing. If the process finds that the left side of the sampled key values changes more slowly than the right side, then the index page is split and the B+tree is preconditioned (step 1248). In one embodiment, if the key contains more than two columns, the columns whose values remain static during the preconditioning comprise the left side of the key. The columns whose values change during preconditioning comprise the right side of the key. In another embodiment, the first column in the key comprises the left side of the key. All other columns comprise the right side of the key.

If no pattern is found in the sampled multi-column key values (decision step 1244) or the left side of the key does not change more slowly than the right side, then the index page is split with no preconditioning (step 1238).

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of software systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for processing a B+tree data structure of a database, comprising:
   determining a pattern of multi-column key values;
   in response to an insert transaction into the database that requires a new index page and before performing the insert transaction, performing the steps including:
   generating a plurality of new multi-column key values based on the pattern;
   storing one or more of the plurality of multi-column key values in one or more new index pages;
   linking each of the plurality of multi-column key values to a respective one of a plurality of new data pages, and linking the one or more new index pages and the new data pages to the B+tree data structure; and
   committing to retentive storage the one or more new index pages and new data pages;
   after committing the one or more new index pages and new data pages, performing the steps including:
   storing data specified in the insert transaction to one of the new data pages; and
   committing the one of the new data pages to retentive storage after storing the data in the one of the new data pages.

2. The method of claim 1, wherein the determining the pattern of multi-column key values includes determining whether a left side of each multi-column key value is constant for a plurality of successive data records in the database, and responsive to the left side of each multi-column key value being constant for a plurality of successive data records in the database, the generating of the plurality of new multi-column key values includes using equal values for the left sides of the plurality of new multi-column key values.

3. The method of claim 2, wherein the equal values for the left sides of the plurality of new multi-column key values are equal to the left sides of the multi-column key values of the successive data records in the database.

4. The method of claim 2, wherein the equal values for the left sides of the plurality of new multi-column key values are equal to a value that succeeds the left side the multi-column key value of the last record in the database.

5. The method of claim 2, wherein the pattern of multi-column key values is determined to have right sides of multi-column key values that change sequentially for a plurality of successive data records in the database, and the generating of the plurality of new multi-column key values includes generating right sides of the plurality of new multi-column key values, wherein the right sides of each successive pair of new multi-column key values covers a sequential range of right sides of the new multi-column key values.

6. The method of claim 2, wherein the pattern of multi-column key values is determined to have right sides of multi-column key values that do not change sequentially for a plurality of successive data records in the database, and the generating of the plurality of new multi-column key values includes copying a plurality of right sides of multi-column key values from a plurality of successive index records that includes the last index record in the database to the right sides of the plurality of new multi-column key values.

7. The method of claim 1, wherein the plurality of new multi-column key values is equal to a maximum number of index records that the new index page can store.

8. The method of claim 1, wherein the B+tree has a plurality of levels of index pages and index pages at the first level reference data pages and index pages at a second level reference index pages at the first level, the method further comprising:
   storing one of the plurality of new multi-column key values per each new index page at the first level; and
   storing the plurality of new multi-column key values in one or more index pages at the second level.

9. The method of claim 1, wherein the B+tree has a plurality of levels of index pages and index pages at the first level reference data pages and index pages at a second level reference index pages at the first level, the method further comprising:
   storing a random number of the plurality of new multi-column key values per each new index page at the first level; and
   storing the plurality of new multi-column key values in one or more index pages at the second level.

10. The method of claim 1, wherein the B+tree has a plurality of levels of index pages and index pages at the first level reference data pages and index pages at a second level reference index pages at the first level, the method further comprising:
    storing one of the plurality of new multi-column key values per each new index page at the first level;
    storing the plurality of new multi-column key values in one or more index pages at the second level; and wherein each new index page above index pages at the first level has empty space available for new index records.

11. A database management system, comprising:
a processor arrangement;
a memory coupled to the processor arrangement, the memory configured with instructions executable by the processor arrangement for processing a B+tree data structure for data records of a database;
a mass storage arrangement coupled to the memory for retentive storage of the B+tree data structure;
wherein the processor arrangement in executing the instructions, determines a pattern of multi-column key values from column data types and multi-column key values in the database, wherein the plurality of new multi-column key values is equal to a maximum number of index records that the new index page can store;
in response to an insert transaction into the database that requires a new index page and before performing the insert transaction, the processor:
obtains one or more new index pages;
generates a plurality of new multi-column key values based on the pattern;
stores the new multi-column key values in the new index pages;
obtains one or more new data pages;
stores in the one or more new index pages in association with each of the plurality of multi-column key values, references to respective ones of the one or more new data pages, and links the one or more new index pages in the B+tree data structure; and
commits to retentive storage the one or more new index pages and new data pages;
after committing the one or more new index pages and new data pages, the processor:
stores data specified in the insert transaction to one of the new data pages; and
commits the one of the new data pages to retentive storage after storing the data in the one of the new data pages.

12. A database management system, comprising:
a processor arrangement;
a memory coupled to the processor arrangement, the memory configured with instructions executable by the processor arrangement for processing a B+tree data structure for data records of a database;
a mass storage arrangement coupled to the memory for retentive storage of the B+tree data structure, wherein the B+tree has a plurality of levels of index pages and index pages at the first level reference data pages and index pages at a second level reference index pages at the first level;
a mass storage arrangement coupled to the memory for retentive storage of the B+tree data structure;
wherein the processor arrangement in executing the instructions, determines a pattern of multi-column key values from column data types and multi-column key values in the database;
in response to an insert transaction into the database that requires a new index page and before performing the insert transaction, the processor:
obtains one or more new index pages;
generates a plurality of new multi-column key values based on the pattern;
stores the new multi-column key values in the new index pages;
obtains one or more new data pages;
stores in the one or more new index pages in association with each of the plurality of multi-column key values, references to respective ones of the one or more new data pages, and links the one or more new index pages in the B+tree data structure;
stores a random number of the plurality of new multi-column key values per each new index page at the first level;
stores the plurality of new multi-column key values in one or more index pages at the second level; and
commits to retentive storage the one or more new index pages and new data pages;
after committing the one or more new index pages and new data pages, the processor:
stores data specified in the insert transaction to one of the new data pages; and
commits the one of the new data pages to retentive storage after storing the data in the one of the new data pages.

* * * * *